US011131502B2

(12) United States Patent
Kisner et al.

(10) Patent No.: US 11,131,502 B2
(45) Date of Patent: Sep. 28, 2021

(54) HEATING SYSTEM WITH INDUCTION POWER SUPPLY AND ELECTROMAGNETIC ACOUSTIC TRANSDUCER WITH INDUCTION POWER SUPPLY

(71) Applicant: UT-Battelle, LLC, Oak Ridge, TN (US)

(72) Inventors: Roger A. Kisner, Knoxville, TN (US); Christi R. Johnson, Kingston, TN (US); Frederick K. Reed, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 161 days.

(21) Appl. No.: 16/103,340

(22) Filed: Aug. 14, 2018

(65) Prior Publication Data

US 2019/0072327 A1 Mar. 7, 2019

Related U.S. Application Data

(60) Provisional application No. 62/545,086, filed on Aug. 14, 2017.

(51) Int. Cl.
*H05B 1/02* (2006.01)
*F26B 5/02* (2006.01)
(Continued)

(52) U.S. Cl.
CPC ............ *F26B 5/02* (2013.01); *F26B 3/20* (2013.01); *F26B 23/10* (2013.01); *F26B 25/02* (2013.01);
(Continued)

(58) Field of Classification Search
CPC .... F26B 5/02; F26B 3/20; F26B 23/10; F26B 25/02; H05B 1/02; H05B 1/0219; H05B 1/0225; H05B 1/0244; H05B 6/108
(Continued)

(56) References Cited

U.S. PATENT DOCUMENTS 2,783,384 A 2/1957 Bright et al.
3,107,152 A 10/1963 Ford et al.
(Continued)

FOREIGN PATENT DOCUMENTS

| CN | 102494315 A | 6/2012 |
|---|---|---|
| CN | 202719427 U | 2/2013 |
| WO | 2016/182832 A1 | 11/2016 |

OTHER PUBLICATIONS

Markus, J., "Guidebook of Electronic Circuits", 1974, p. 952.
(Continued)

*Primary Examiner* — Mark H Paschall
(74) *Attorney, Agent, or Firm* — Scully, Scott, Murphy & Presser, P.C.

(57) ABSTRACT

A system for heating a fluid and an electromagnetic acoustic transducer EMAT system is provided. Both systems have a drive circuit. The amount of heat and the amplitude (and acceleration) of the vibrations is respectively controllable by controlling an input to a terminal of a switch. The heating system comprises a porous graphite foam conductor which is exposed to an electromagnetic field generated by an oscillating circuit. When exposed, the foam conductor conducts induced electric current which heats the same and a fluid in contact with the conductor. The EMAT system comprises at least one magnet configured to generate a static magnetic field, an oscillating circuit and a working element. The working element, when exposed to the static magnetic field and the electromagnetic field produced by the oscillating circuit, vibrates against a load. The vibrations dry the load.

22 Claims, 25 Drawing Sheets

(51) Int. Cl.
*H02J 5/00* (2016.01)
*F26B 23/10* (2006.01)
*F26B 25/02* (2006.01)
*H05B 6/10* (2006.01)
*F26B 3/20* (2006.01)

(52) U.S. Cl.
CPC ............ *H02J 5/005* (2013.01); *H05B 1/0219* (2013.01); *H05B 1/0225* (2013.01); *H05B 1/0244* (2013.01); *H05B 6/108* (2013.01)

(58) Field of Classification Search
USPC ............... 219/209, 210, 494, 497, 492, 490
See application file for complete search history.

(56) References Cited

U.S. PATENT DOCUMENTS

| | | |
|---|---|---|
| 3,116,392 A | 12/1963 | Morey |
| 3,411,123 A | 11/1968 | Kydd |
| 3,980,496 A | 9/1976 | Ludwig et al. |
| 4,309,586 A | 1/1982 | Ishibashi |
| 4,327,268 A | 4/1982 | Frank |
| 4,757,177 A | 7/1988 | Suzuki et al. |
| 4,803,370 A | 2/1989 | Eckles |
| 4,888,461 A | 12/1989 | Takano et al. |
| 4,894,562 A | 1/1990 | Cavaliere et al. |
| 4,900,885 A | 2/1990 | Inumada |
| 4,959,557 A | 9/1990 | Miller |
| 5,061,835 A | 10/1991 | Iguchi |
| 5,140,118 A | 8/1992 | Catanese et al. |
| 5,329,100 A | 7/1994 | Lee |
| 5,481,091 A | 1/1996 | Grimm et al. |
| 5,504,309 A | 4/1996 | Geissler |
| 5,536,920 A | 7/1996 | Kwon |
| 6,025,739 A | 2/2000 | Campbell |
| 6,033,506 A | 3/2000 | Klett |
| 6,217,800 B1 | 4/2001 | Hayward |
| 6,261,485 B1 | 7/2001 | Klett |
| 6,387,343 B1 | 2/2002 | Klett |
| 6,654,549 B1 | 11/2003 | Konishi |
| 6,673,328 B1 | 1/2004 | Klett |
| 6,729,269 B2 | 5/2004 | Ott et al. |
| 7,018,093 B2 | 3/2006 | Park et al. |
| 7,070,755 B2 | 7/2006 | Klett et al. |
| 7,427,905 B2 * | 9/2008 | Lutz .................. H03H 9/02448 333/186 |
| 8,350,198 B2 | 1/2013 | Belsh et al. |
| 8,575,993 B2 * | 11/2013 | Penzes ................. H03K 5/133 327/512 |
| 9,083,062 B2 | 7/2015 | Kumar et al. |
| 9,214,330 B2 | 12/2015 | Kawakami et al. |
| 9,739,501 B2 | 8/2017 | Klett et al. |
| RE46,673 E * | 1/2018 | Lai ...................... H02J 7/00304 |
| 10,845,375 B2 * | 11/2020 | Sommer ................ H01L 37/00 |
| 2005/0095168 A1 | 5/2005 | Centanni et al. |
| 2010/0051607 A1 | 3/2010 | Yang et al. |
| 2011/0253693 A1 * | 10/2011 | Lyons ................. F24C 15/2021 219/209 |
| 2012/0049239 A1 | 3/2012 | Sung |
| 2012/0107555 A1 | 5/2012 | Miller et al. |
| 2014/0017159 A1 | 1/2014 | Hsiao |
| 2014/0291690 A1 | 10/2014 | Yi et al. |

OTHER PUBLICATIONS www.ambrell.com/PDFo/411-0169-10.pdf, "Ambrell Precision Induction heating".

International Search Report and the Written Opinion of the International Searching Authority dated Jan. 6, 2016 from International Application No. PCT/US15/45633.

Lin, W. et al., "Review on graphite foam as a thermal material for heat exchangers", Department of Energy Sciences, Lund University, Sweden. Energy End-Use Efficiency Issues (EEE), World Renewable Energy Congress, May 2011, pp. 748-755.

Drummond, K., "Thermal Characterization of Graphitic Foams for Use in Thermal Storage Applications", Department of Mechanical Engineering, Russ College of Engineering and Technology. Dec. 2012; pp. 1-105.

http://www.koppers.com/pages/kfoam, "Koppers, Kfoam Product Brochure" Jul. 20, 2014.

Klett, J. et al., "High-thermal-conductivity, mesophase-pitch-derived carbon foams: effect on precursor on structure and properties" Oak Ridge National Laboratory, Oak Ridge Tennesee, Carbon, vol. 38, Issue 7, 2000, pp. 953-973.

The International Search Report and the Written Opinion of the International Searching Authority dated Nov. 24, 2015 from International Application No. PCT/US15/45633.

* cited by examiner

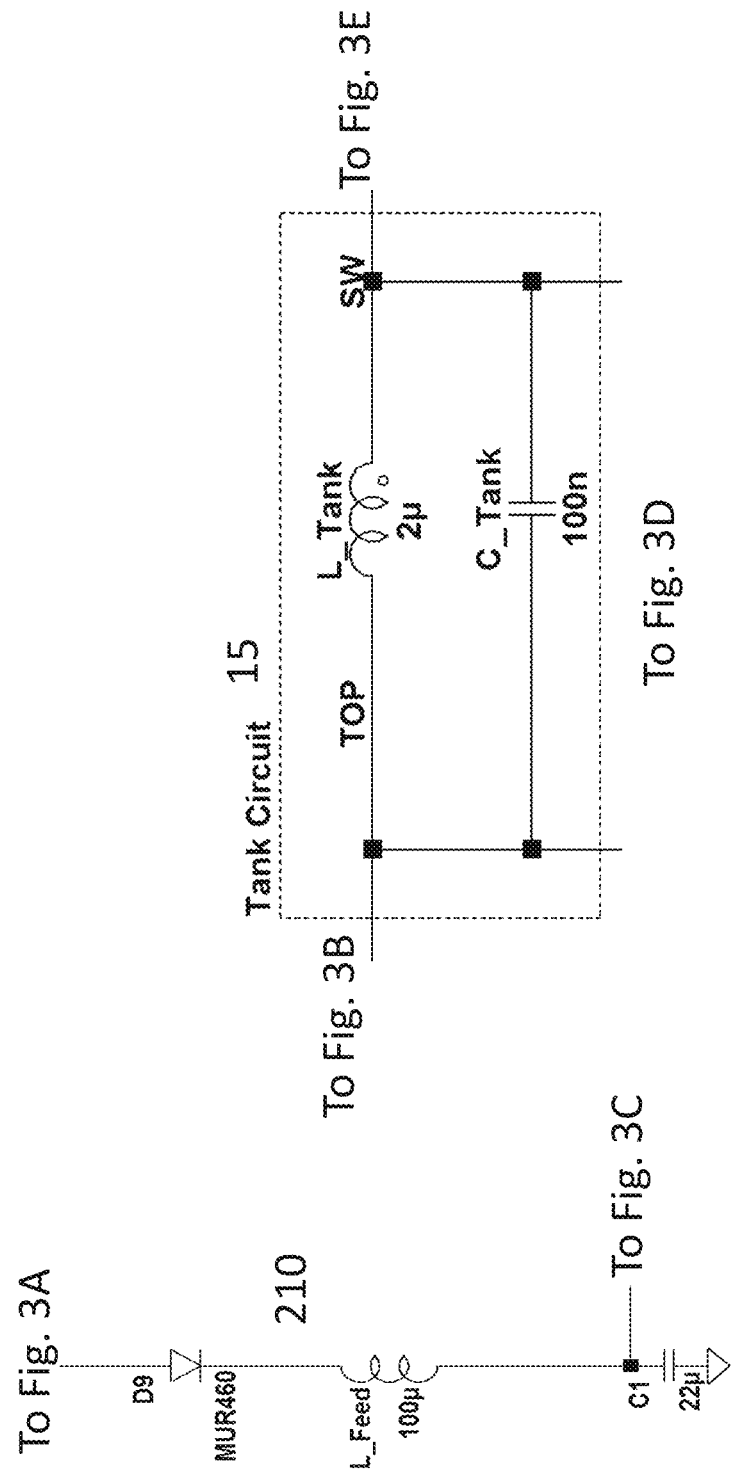

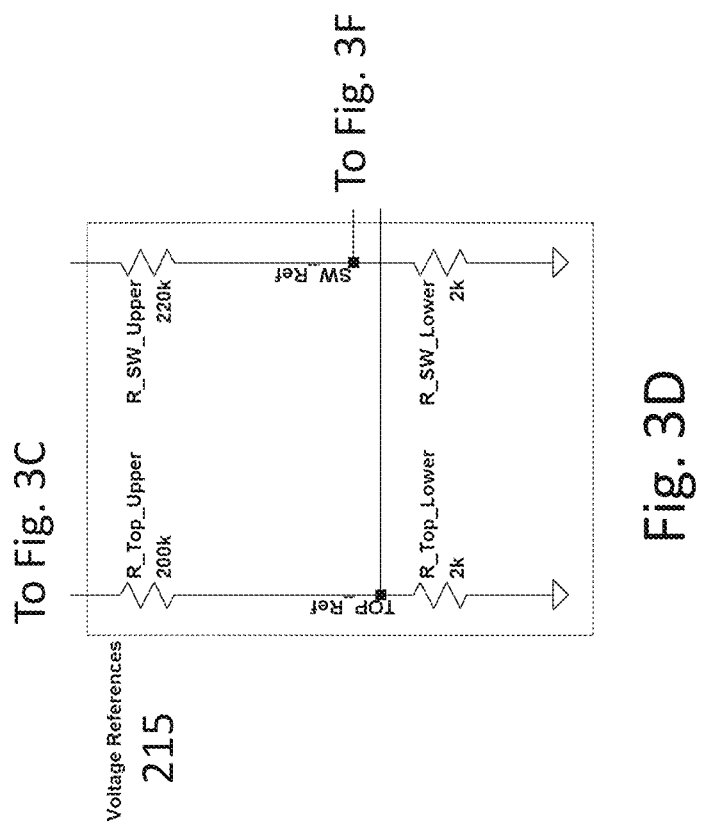

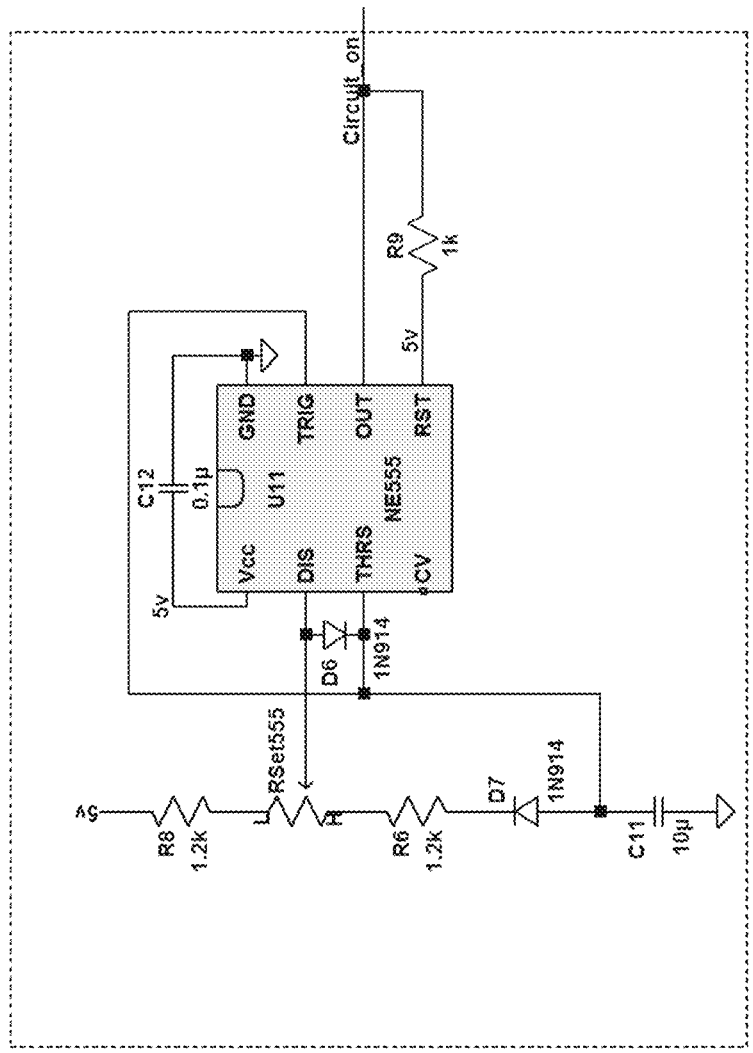

HEATING SYSTEM WITH INDUCTION POWER SUPPLY AND ELECTROMAGNETIC ACOUSTIC TRANSDUCER WITH INDUCTION POWER SUPPLY

CROSS REFERENCE TO RELATED APPLICATION

The present application claims benefit of U.S. Provisional Application No. 62/545,086, filed on Aug. 14, 2017, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE DISCLOSURE

The present disclosure relates to heating systems and inductive power transfer and more specifically the use of an inductive power supply to cause a porous graphite foam conductor to emit controllable heating. The present disclosure also relates to electromagnetic acoustic transducer (EMAT) having an inductive power supply and controlling the output of the EMAT.

BACKGROUND

WO 2016/182832 discloses an ultrasonic dryer. The dryer comprises a plurality of piezoelectric transducers (PZT). The energy is directed at moist fabric which removes water by conversion to a cool mist. Each PZT contacts the fabric. A PZT may be disk-shaped. Each PZT receives power levels of a few watts. Electric power (at resonant frequency) is converted to vibration energy. The resonant frequency may be in a range from 40 kHz to 1 MHz, as needed. However, as larger vibration powers are used, the PZT may experience reduced durability.

U.S. Pat. No. 9,739,501 discloses a heating system using a porous foam graphite conductor. U.S. Pat. No. 9,739,501 is incorporated herein by reference. The foams described in the U.S. Pat. No. 9,739,501 have high thermal conductivity.

SUMMARY

Accordingly, disclosed is a heating system having an inductive power supply. The inductive power supply comprises an oscillating circuit and a drive circuit. The drive circuit may be operable directly from an input power supply and is configured to receive a wide variety of input voltages. Additionally, the drive circuit is configured to be used with various different oscillating inductors and operates over a range of resonant frequencies.

In an aspect of the disclosure, the system for producing heat comprises a housing having a porous graphite foam conductor, an oscillating circuit, at least one load flow path and a drive circuit. The porous graphite foam conductor comprises a plurality of pores including subsurface portions that are interconnected so as to permit a load to flow there through. The oscillating circuit comprises a first inductor and a first capacitor. The first inductor has a first terminal and a second terminal. The oscillating circuit is configured to generate an electromagnetic field, and the porous graphite foam conductor when exposed to the electromagnetic field conducts an induced electric current. The induced electric current heats the porous graphite foam conductor including subsurface pore wall portions. The at least one load flow path enables contact of the load with the porous graphite foam conductor. The porous graphite foam conductor transfers heat to the load. The drive circuit is couplable to a power source and the oscillating circuit. The drive circuit is configured to regulate an amount of heat produced by the porous graphite foam conductor. The drive circuit comprises an AC/DC conversion circuit and a switch. The AC/DC conversion circuit is configured to convert AC power from the AC power source into DC power. The switch has a first terminal, a second terminal and a third terminal. The first terminal is coupled to the second terminal of the first inductor. The second terminal of the switch is coupled to ground. The third terminal of the switch is coupled to a switch control circuit. The switch is turned on when an integrated signal representative of a difference of a voltage proportional to the first terminal and a voltage proportional to the second terminal of the first inductor is between a first voltage threshold and a second voltage threshold and based on a timing signal.

In other aspects, an electromagnetic acoustic transducer (EMAT) system is disclosed. The EMAT system comprises at least one magnet configured to generate a static magnetic field, an oscillating circuit, a working element and a drive circuit. The oscillating circuit is configured to generate an electromagnetic field. The oscillating circuit comprises a first inductor and a first capacitor. The first inductor has a first terminal and a second terminal. The working element, when exposed to the static magnetic field and the electromagnetic field vibrates against a load. The vibration has an amplitude, an acceleration and a frequency. The drive circuit is couplable to an AC power source and the oscillating circuit. The drive circuit is configured to regulate the amplitude. The drive circuit comprises an AC/DC conversion circuit and a switch. The AC/DC conversion circuit is configured to convert AC power from the AC power source into DC power. The switch has a first terminal, a second terminal and a third terminal. The first terminal is coupled to the second terminal of the first inductor. The second terminal of the switch is coupled to ground. The third terminal of the switch is coupled to a switch control circuit. The switch is turned on when an integrated signal representative of a difference of a voltage proportional to the first terminal and a voltage proportional to the second terminal of the first inductor is between a first voltage threshold and a second voltage threshold and based on a timing signal.

BRIEF DESCRIPTION OF THE DRAWINGS

FIG. 3B is a circuit diagram of a portion of the drive circuit including the decoupling and a capacitor;

FIG. 3C is a circuit diagram of an oscillating circuit;

FIG. 3D is a circuit diagram of a portion of the drive circuit including voltage references;

FIG. 3G is a circuit diagram of a portion of the drive circuit including a run time duration;

FIG. 3I is a circuit diagram of a porous graphite load model;

FIG. 4A depicts the inductor current in the oscillating circuit, the Top Voltage (first terminal) and the SW voltage (second terminal), FIG. 4B depicts the voltage at the first comparator, a signal representative of an integrated difference between a voltage proportional to the first terminal and a voltage proportional to the second terminal and the two voltage thresholds, FIG. 4C depicts the gate voltage of the MOSFET;

DETAILED DESCRIPTION

Figure 1A:
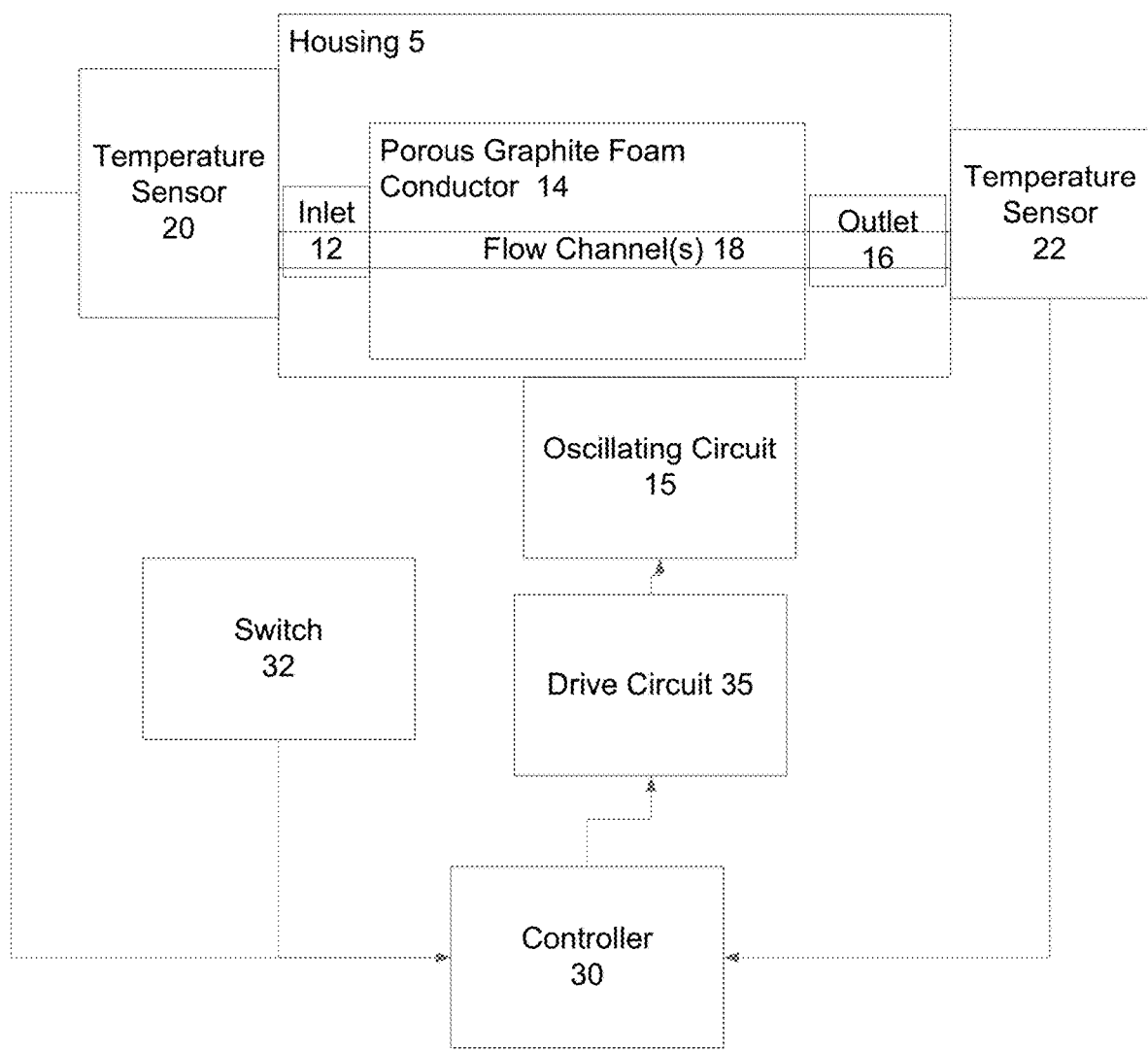
FIG. 1A is a block diagram of a heating system in accordance with aspects of the disclosure.

FIG. 1A depicts a heating system 1 according to aspects of the disclosure. The heating system 1 comprises a porous graphite foam conductor 14 that may be mounted in any suitable manner. The porous graphite foam conductor 14 is in proximity to a source of a varying electromagnetic field (time varying) such as an oscillating circuit 15 (also referred to herein as tank circuit).

The porous graphite foam conductor 14 is contained within a housing 5. Many shapes and sizes of the housing 5 may be utilized. In one aspect, the housing 5 may be tubular. Any suitable non-conducting housing 5 material may be used. In one aspect, the housing 5 may be polyvinyl chloride (PVC).

The housing 5 has an inlet 12 and an outlet 16. The inlet 12 is configured and dimensioned to allow fluid to enter the housing 5 and the outlet 16 is configured and dimensioned to allow fluid to exit the housing 5.

The inlet 12 may be a flow valve. In an aspect of the disclosure, the flow valve may be a regulated valve that is controllable to allow a set flow rate to enter the housing 5. In an aspect of the disclosure, the inlet 12 comprises a flow sensor (not shown) such as a rotameter. A signal from the flow sensor may be sent to a controller 30 as feedback to control power supplied by the drive circuit 35 (which will be described later).

The heating system 1 may be used to heat objects and materials by heating stationary or flowing fluids flowing over or through the porous graphite foam conductor 14. The fluid may be water. Other fluids including other liquids, gases, and mixtures of both may be heated. The fluid enters the inlet 5 at one temperature T1 and exits the outlet 16 at a second temperature T2, where T2>T1.

The porous graphite foam conductor 14 is disposed within the electromagnetic field which is generated by the oscillating circuit 15. The porous graphite foam conductor 14 when exposed to the electromagnetic field conducts an induced electric current. The electric current heats the porous graphite foam conductor 14. At least one flow channel 18 is provided for enabling the fluid to contact with the porous graphite foam conductor 14, whereby the heated porous graphite foam conductor 14 transfers heat to the fluid causing the temperature of the fluid to rise.

Figure 1B:
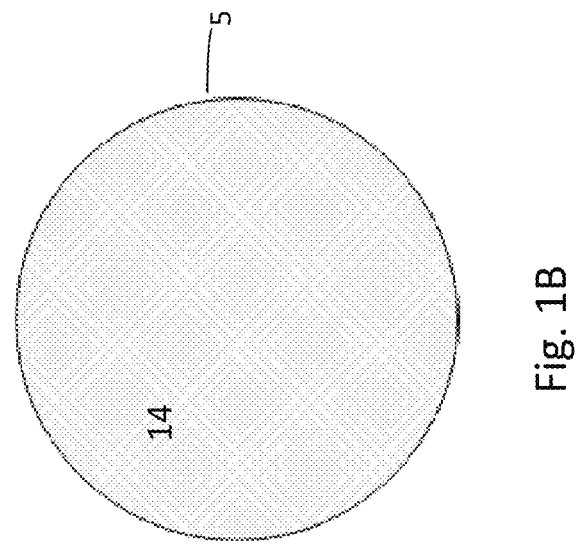
FIGS. 1B-1D are sectional views of the porous graphite form conductor and flow channels in accordance with aspects of the disclosure, in FIG. 1B the pores are the flow channel, in FIG. 1C the flow channel is a central flow channel and in FIG. 1C there are a plurality of flow channels.

The pores of the porous graphite foam conductor 14 will permit the passage of fluids such as liquids and gases. Thus, in an aspect of the disclosure, the pores themselves act as a flow channel. FIG. 1B depicts a sectional view of a porous graphite foam conductor 14 contained in the housing 5. The non-conductive housing 5 contains the flow of fluid through the porous graphite foam conductor 14.

Flow channels 18 through the porous graphite foam conductor 14 may be provided where increased flow rates and/or reduced pressure drops are desired. The size, number and position (orientation) of such flow channels 18 within the porous graphite foam conductor 14 may be varied depending on the application. The flow channels 18 may be straight or curved or fitted with baffles to increase heat transfer interaction with the porous graphite foam conductor 14 as the fluid passes through the flow channels 18. In an aspect of the disclosure, the channels 18 extend in a longitudinal direction within the porous graphite foam conductor 14 to increase the time that the fluid is exposed to the porous graphite foam conductor 14. Thus, fluid flowing from the inlet 12 into the flow channels 18 at a temperature T1 is heated by the porous graphite foam conductor 14 and exits the outlet 16 from the channels 18 at temperature T2.

Figure 1D:
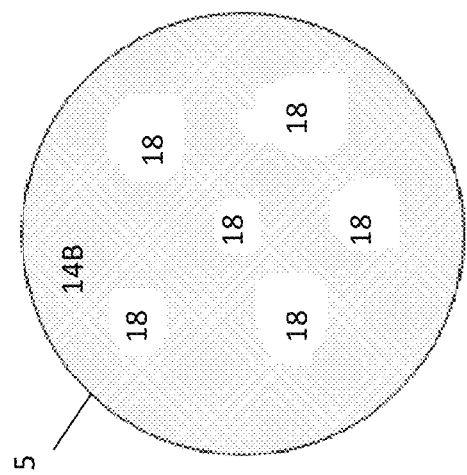
Figure 1C:
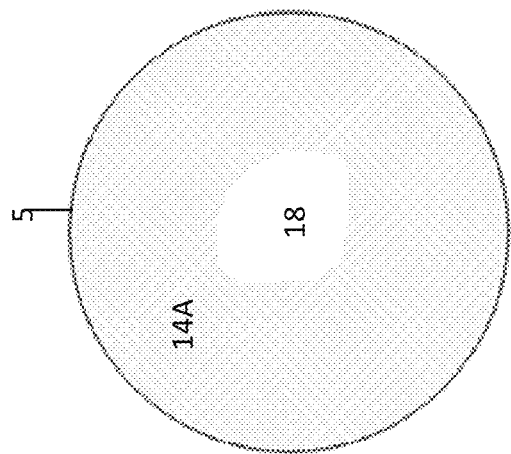

FIGS. 1C and 1D show examples of the flow channels. In FIG. 1C, a single flow channel 18 is provided within the porous graphite foam conductor 14A. As depicted, the porous graphite foam conductor 14A has an interior large diameter flow channel 18 to heat a fluid flowing therein at a significant flow rate and with an acceptable pressure drop.

In FIG. 1D, a plurality of flow channels 18 are provided in the porous graphite foam conductor 14B to provide significant heating contact between the porous graphite foam conductor 14B and fluid flowing within the channels 18. Each of the plurality of channels 18 may have a different size, shape or orientation within the porous graphite foam conductor 14B.

The electromagnetic field may be applied by a conductive coil (inductor) such as L_Tank, wrapped around the housing 5, or by some other field-generating device.

The manner in which the electromagnetic field is applied to the porous graphite foam conductor 14 may vary. The source, e.g., inductor L_Tank, should be placed in such proximity to the porous graphite foam conductor 14 that the electromagnetic field sufficiently cuts through the foam to generate a sufficient induced current to satisfy the heating requirements of the particular application. It has been found that an efficient arrangement for positioning the source, e.g., inductor L_Tank, about the porous graphite foam conductor 14 is to wrap coils of the source about the graphite foam 14, and particularly about a non-conductive housing 5 that surrounds the porous graphite foam conductor 14. In an aspect of the disclosure, the electromagnetic field is time varying.

The inductor L_Tank (shown in FIG. 2) may be made of any suitable size, shape and material of conductor. In an aspect of the disclosure, a copper coil may be used for inductor L_Tank. Examples of the inductor L_Tank will be described later.

The heating system 1 further comprises a switch 32. The switch 32 is used to turn ON/OFF the heating system 1. The switch 32 is electrically coupled to the controller 30 (which will be described later). The switch 32 may be manually operated or may be electrically operated as by a solenoid and controlled by a controller 30.

The heating system 1 also comprises a controller 30 and a drive circuit 35. The controller 30 turns a drive circuit 35 ON and OFF and may be used to adjust a timing signal and voltage thresholds (CompRed and CompBlue) to control the power supplied to the oscillating circuit 15. The drive circuit 35 provides inductive power to the oscillating device 15. The drive circuit 35 will be described later in detail. The controller 30 will also be described later in detail. In an aspect of the disclosure, the control may be based a target temperature for the fluid at the outlet 16 (T2) and flow rate.

In an aspect of the disclosure, the heating system 1 further comprises temperature sensors 20, 22. The temperature sensors 20, 22 are electrically coupled to the controller 30. In an aspect of the disclosure, the temperature sensors 20, 22 may communicate with the controller 30 via a wired connection. In another aspect of the disclosure, the temperature sensors 20, 22 may communicate with the controller 30 via wireless communication. One temperature sensor 20 detects temperature of the fluid at the inlet 12 and another temperature sensor 22 detects temperature at the outlet 16. In an aspect of the disclosure, the temperature sensors 20, 22 may be respectively contained within the inlet 12 and outlet 16. In another aspect of the disclosure, the temperature sensors 20, 22 may be adjacent to the inlet 12 and outlet 16. The temperature sensors 20, 22 may be an RTD sensor. Other temperature sensors may be used such as a thermistor, thermopile, or thermocouple. The detected temperature may be used as a feedback to control the drive circuit 35, such as adjust the voltage thresholds and/or timing signal, e.g., power level.

Figure 2:
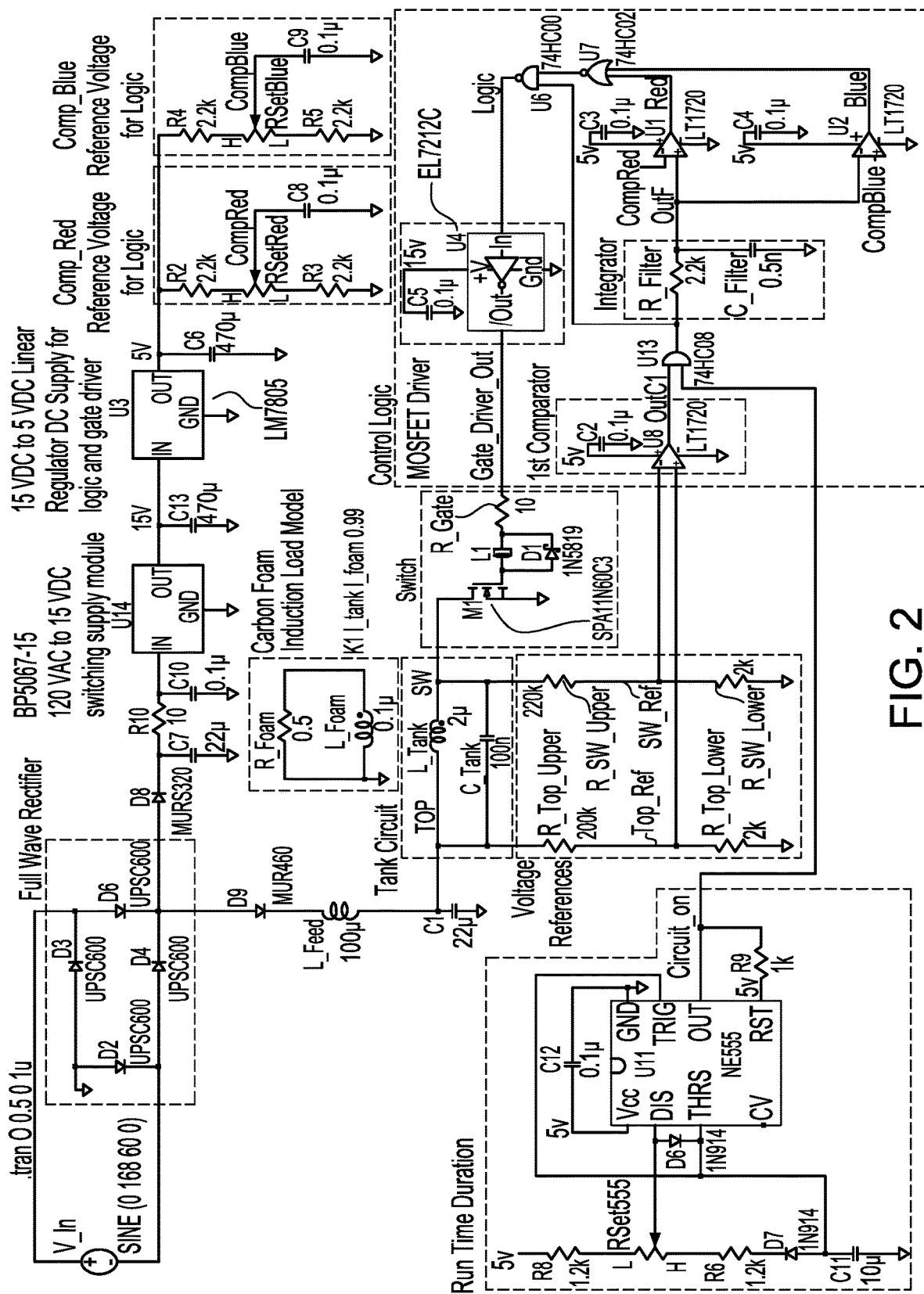
FIG. 2 is a circuit diagram of a drive circuit, an oscillating circuit and a porous graphite load model in accordance with aspects of the disclosure.
Figure 3A:
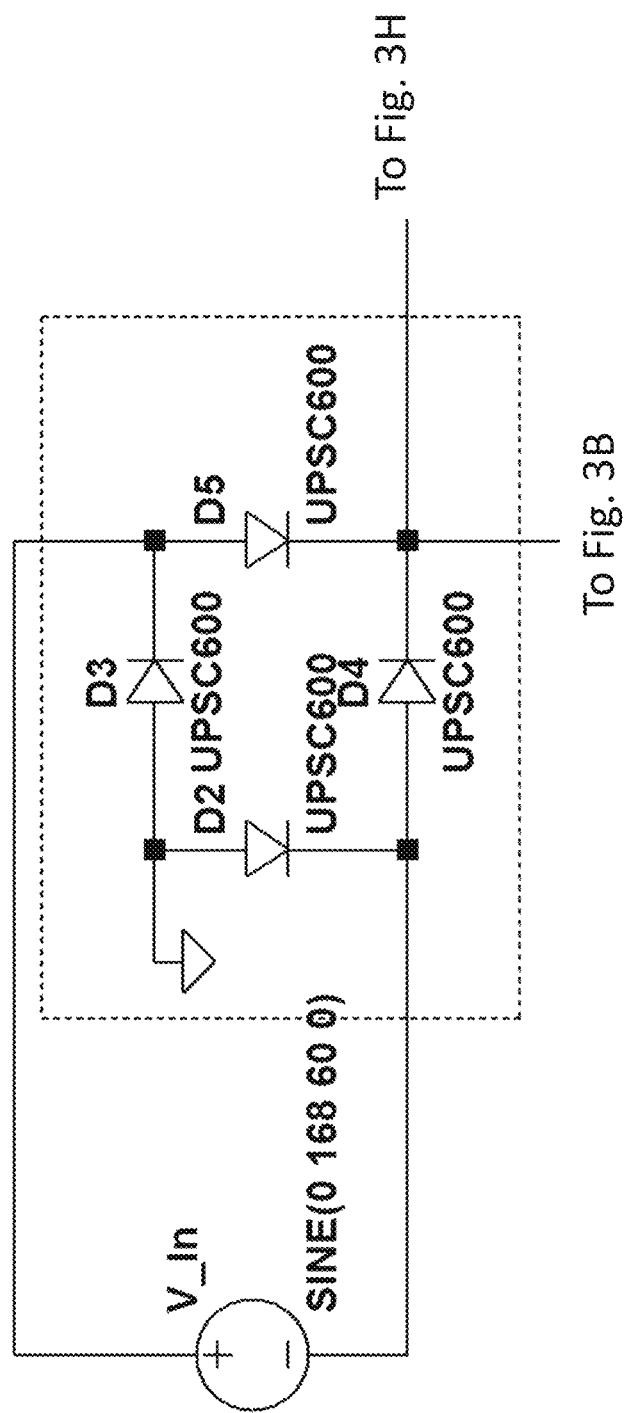
FIG. 3A is a circuit diagram of a portion of the drive circuit including an input source voltage and full wave rectifier.

The drive circuit 35 and oscillating circuit 15 (tank circuit) will now be explained in detail with respect to FIGS. 2 and 3A-3I. FIG. 2 depicts the drive circuit 35 as a complete circuit. For purposes of further clarifying the description, portions of the drive circuit were divided into separate figures, e.g., FIGS. 3A, 3B, 3D, 3E, 3F, 3G and 3H. The oscillating circuit 15 (tank circuit) is also depicted in FIG. 3C and the porous graphite foam conductor 14 is modeled as carbon foam induction model 245 in FIG. 3I. The porous graphite foam conductor 10 is modeled as a resistor R_Foam and inductor L_Foam. In FIG. 3A-3I where the portions of the circuit depict connect with other portions of the circuit, other figures having the same are referenced.

The figures depict specific values for the components and specific part numbers for components. The specific values and part numbers are provided for descriptive purposes only as examples. However, in practice, the values used in the disclosure circuit topology are application specific and may be based at least on the input power source, the desired output power needed, and the desired resonant frequency.

As shown in FIGS. 2 and 3A, the drive circuit 35 comprises an input stage. The input stage include the input AC power V_in and a full wave rectifier 205. In the schematic, V_in is represented by a 168Vpk sine wave (120 VAC RMS). 168Vpk represents the peak amplitude of a 120 VAC RMS supply. A frequency of 60 Hz was used. The "tran" command above the circuit is a transient analysis command for the SPICE software. In an aspect of the disclosure, other input voltages may be used, such as 240 VAC. Advantageously, the drive circuit 35 works directly from the input voltage from the power line without requiring a step-down power transformer for a reduced size factor and cost.

The input voltage may be converted into DC by a full wave rectifier 205 as shown in FIG. 3A. The full wave rectifier 205 comprises four diodes D2-D5. D2-D5 are Schottky rectifiers. For example, Part No. UPSC600 may be used. The node after the full wave rectifier 205 is a hot chassis ground.

In other aspects of the disclosure, the input power source may be a DC source and therefore the full wave rectifier 205 may be omitted.

As shown in FIGS. 2 and 3B, the drive circuit 35 comprises decoupling 210. The decoupling 210 is connected to the full wave rectifier 205. In an aspect of the disclosure, the decoupling 210 may comprise a diode D9 connected in series with an inductor L_Feed. In other aspects of the disclosure, a ferrite bead(s) may be placed in the wiring instead of the diode D9 and the inductor L_Feed or in addition to the same. In another aspect of the disclosure, a tapped inductor L_Tap may be used having a capacitor respectively coupled to each tap and to the hot chassis ground instead of the diode D9 and inductor L_Feed. As depicted, L_Feed has an inductance of 100 µH. Diode D9 may be a switchmode power rectifier. For example, Part No. MUR460 may be used. A capacitor C1 is connected between ground and the inductor L_Feed. This capacitor C1 is also connected to a terminal of the oscillating circuit 15 (TOP) as shown in FIG. 2. One plate of the capacitor C1 is connected to TOP (first terminal) and one plate is connected to ground. The capacitor C1 prevents the voltage at the first terminal from going to ground at its low point. As depicted, the capacitor C1 has a capacitance of 22 µF.

Figure 3E:
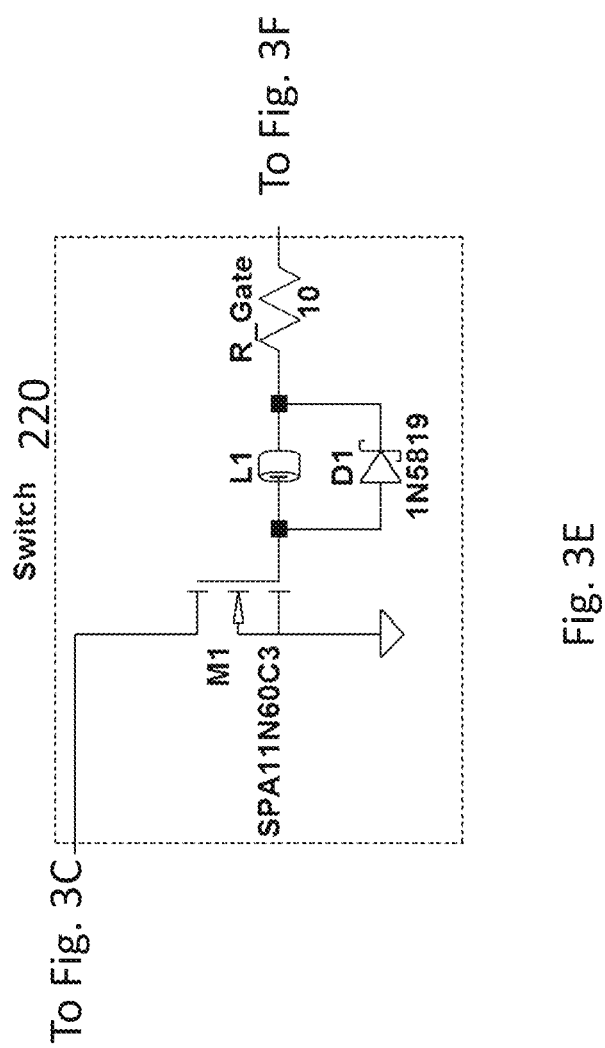
FIG. 3E is a circuit diagram of a portion of the drive circuit including a switch.
Figure 3F:
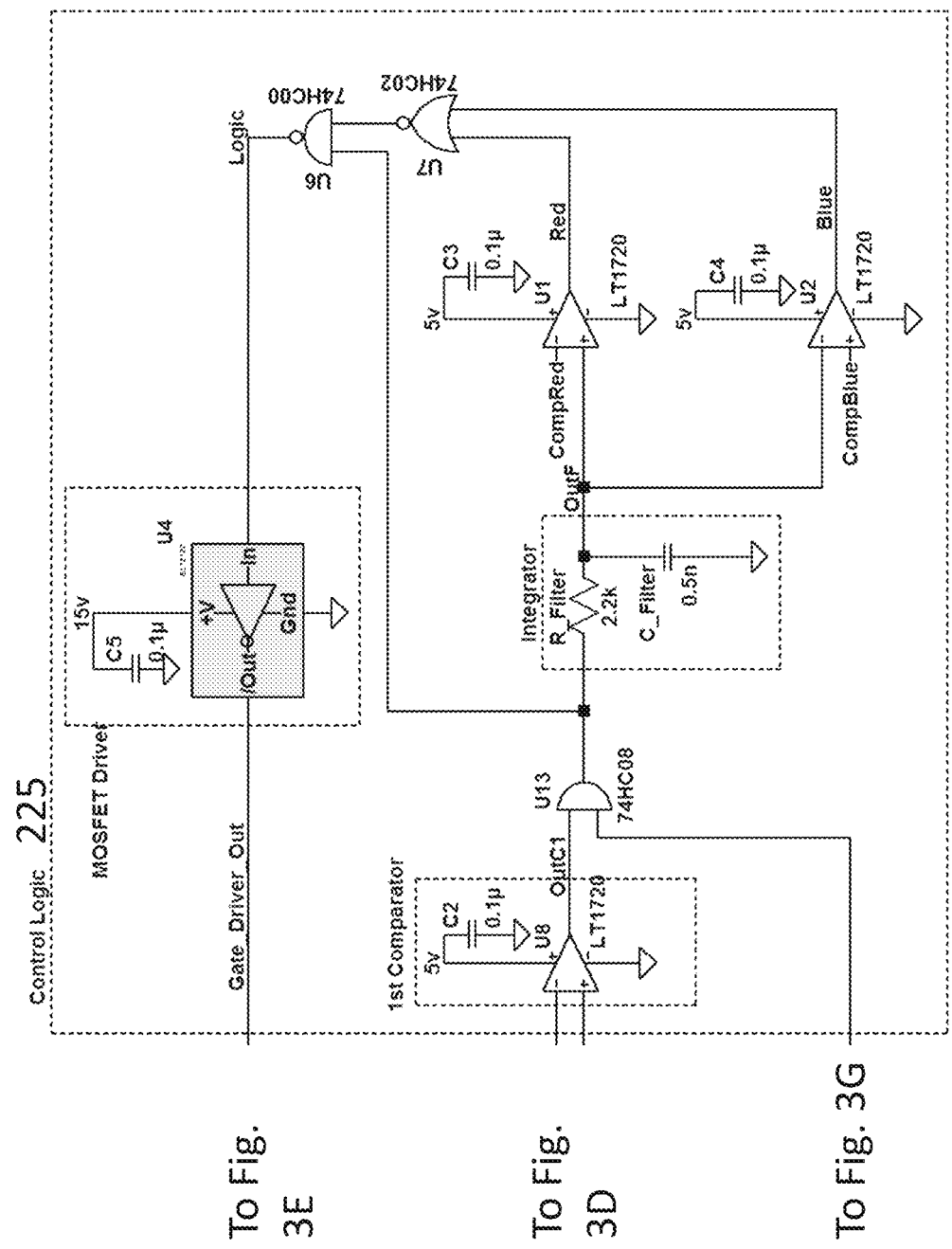
FIG. 3F is a circuit diagram of a portion of the drive circuit including control logic.
Figure 3H:
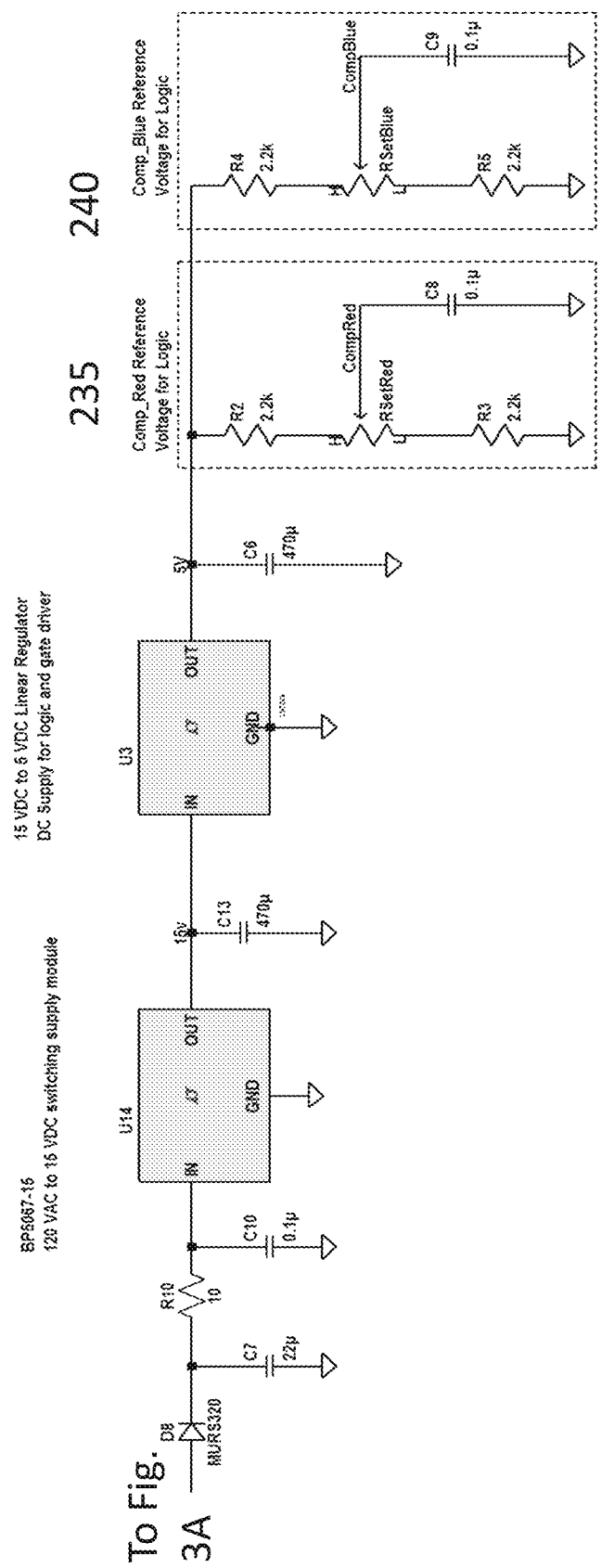
FIG. 3H is a circuit diagram of a portion of the drive circuit including threshold controls and linear regulators.
Figure 31:
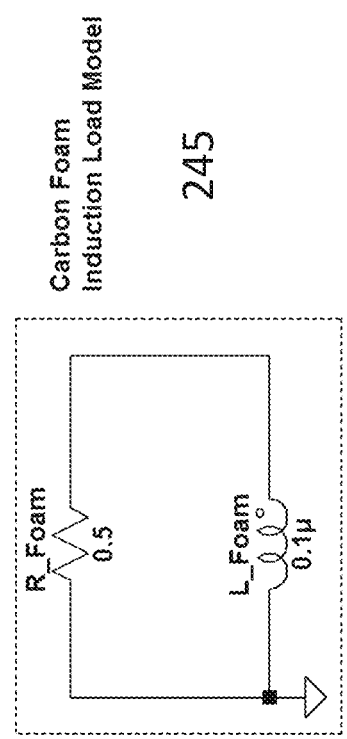

As shown in FIGS. 2 and 3H, the drive circuit 35 comprises a housekeep voltage generating portion and logic threshold generation portions 235 and 240. The housekeep voltage generating portion (also referred to as housekeeping circuit) generates the voltages used as power for other parts of the drive circuit. For example, 5V is used for the comparators U1/U2/U8 and the run time duration 230 and 15V is used for the gate driver U4. The housekeep voltage generating portion is connected to the full wave rectifier 205 and the logic threshold generation portions 235 and 240. The housekeeping voltage generating portion comprises a diode D8, a resistor R10 and pair of capacitors C7 and C10. The diode D8 is connected to the full wave rectifier 205 at one end and the resistor R10 and capacitor C7 at the other end. Capacitors C7 and C10 are connected at each end of the resistor R10. This portion of the housekeeping circuit filters the voltage supplied by the full wave rectifier 205. Diode D8 may be a surface mounted rectifier. For example, Part No. MURS320 may be used. As shown, resistor R10 has a resistance of 10Ω. C7 has a capacitance of 22 μF and C10 has a capacitance of 0.1 μF.

The housekeeping circuit further comprises two linear regulators U14 and U3 (DC-to-DC converters). Linear regulator U14 takes the voltage input into IN and converts it to 15V output. In other aspects of the disclosure, a switching supply module (switch mode device) may be used instead of linear regulator. For example, Part No. BP5067-15 as also identified in FIGS. 2 and 3H may be used. If, the BP5067-15 switching supply module is used an inductor may be added connecting to two of the pins of the module. Other switching supply modules may be used. The second linear regulator U3 takes 15V (input) and outputs 5V. In other aspects of the disclosure, U3 may be a switch mode device. Capacitors C13 and C6 are respectively connected to the 15V and the 5V and also to ground. For example, capacitors C13 and C6 may have a capacitance of 470 μF.

Each logic threshold generation portion (235 and 240) has the same topology. The portions comprise a resistive divider (voltage divider), a potentiometer and a capacitor. The logic threshold generation portion 235 generates CompRed, which is the higher voltage threshold and logic threshold generation portion 240 generates CompBlue, which is the lower voltage threshold. These voltage thresholds are used to determine when to turn a switch, such as MOSFET M1 ON or OFF (and how long), as described later. The logic threshold generation portion 235 comprises resistors R2 and R3 and capacitor C8. As illustrated, resistors R2 and R3 have a resistance of 2.2 kΩ Capacitor C8 has a capacitance of 0.1 μF. The logic threshold generation portion 240 comprises resistors R4 and R5 and capacitor C9. As illustrated, resistors R4 and R5 have a resistance of 2.2 kΩ. Capacitor C9 has a capacitance of 0.1 μF. Potentiometers RSetRed and RSetBlue have the same resistance range, but the set points are different. Rt=10K, however, the set point for CompRed is 0.65 whereas the set point for CompBlue is 0.55. The initial set points are only described for example and other initial set points may be used as required. Changing the set points controls the ON time of the switch, such as MOSFET M1, which in turn controls the power supplied to the oscillating circuit 15. Therefore, the heat emitted by the porous graphite foam conductor 14 is controlled by controlling the set points.

As shown in FIGS. 2 and 3D, the drive circuit 35 has voltage references 215 (also referred to as reference circuit 215). The reference circuit 215 is connected to the TOP (the first terminal) and SW (second terminal) of the oscillating circuit 15 (Tank Circuit). The reference circuit 215 is designed to get reference voltages proportional to the voltages on the TOP (first terminal) and SW (second terminal) respectively and supply the same to the control logic 225. These voltages are TOP_Ref and SW_Ref. TOP_Ref is proportional to the voltage at TOP (first terminal) and SW_Ref is proportional to the voltage at SW (second terminal). The proportion is based on the resistive divider (voltage divider). Resistors R_Top_Upper and R_Top_Lower form the resistive divider for TOP (first terminal) and resistors R_SW_Upper and R_SW_Lower form the resistive divider for SW (second terminal). The resistors R_Top_Upper and R_SW_Upper have different values to ensure that the oscillation starts. As illustrated, resistor R_Top_Upper has a resistance of 200 kΩ and resistor R_SW_Upper has a resistance of 220 kΩ. Also as illustrated, resistors R_Top_Lower and R_SW_Lower have a resistance of 2 kΩ.

In an aspect of the disclosure, to reduce noise which may be input into the first comparator U8, capacitors may be respectively connected to the input pins of the first comparator U8 and TOP_Ref and SW_Ref.

As shown in FIGS. 2 and 3F, the drive circuit 35 has control logic 225. The control logic 225 comprises a plurality of comparators and logic gates. For example, the control logic 225 comprises a first comparator U8. The first comparator U8 receives the reference voltages, e.g., TOP_Ref and SW_Ref. The TOP_Ref is connected to the +pin and the SW_Ref is connected to the −pin. The 5V from the housekeeping circuit is input to VCC. Part No. LT1720 may be used as the first comparator U8. Capacitor C2 is also connected to the 5V and ground. As illustrated, the capacitor C2 has a capacitance of 0.1 μF. The first comparator U8 outputs a signal representing a difference of the two reference voltages, e.g., OutC1. OutC1 is supplied to a logic gate U13, which is a two input AND gate. The other input is a timing signal which is supplied by the run time duration 230. When both signals are high, the AND gate U13 outputs a high logic state. The output of the AND gate U13 is supplied to an NAND gate U6. Part No. 74HC08 may be used as the AND gate U13 and Part No. 74HC00 may be used as the NAND gate U6.

Therefore, the use of the timing signal with the AND gate U13, effectively controls when the AND gate U13 is able to output a high logic state and in turn controls when the NAND gate U6 outputs an appropriate logic signal to control the switch, e.g., control the gate of the semiconductor switch such as MOSFET M1. Since the gate driver U4 is an inverting gate driver, when the NAND gate U6 outputs a high logic state, switch, e.g., MOSFET M1 is turned OFF. Only when the NAND gate U6 outputs a low logic state, e.g., 0, will the switch, e.g., MOSFET M1 turn ON. Accordingly, only when the timing signal is a high logic state can the switch, e.g., MOSFET M1 be turned ON. Advantageously, by controlling the timing signal, the timing that the switch, e.g., MOSFET M1 is turned on can be controlled.

When the timing signal is high, the AND gate U13 may output a high logic state. The high logic state also representative of the difference between the two reference voltages (at the appropriate control timing). The logic state, e.g., high or low is integrated by an integrator. As illustrated, the integrator is a resistance and capacitor combination, e.g., R_Filter and C_Filter, respectively having a resistance of 2.2 kΩ and 0.5 nF. The integrator output OutF. The output OutF is supplied to two comparators U1 and U2. U1 and U2 are both two input comparators. One of the comparators U1 compares the OutF with CompRed (one voltage threshold) and one of the comparators U2 compares OutF with CompBlue (the other voltage threshold). CompRed is supplied to the −pin and CompBlue is supplied to the +pin. The comparators U1 and U2 may be the same as comparator U8. Also similar to comparator U8, comparators U1 and U2 are supplied with the 5V from the housekeeping circuit and respectively have capacitors C3 and C4. As illustrated, the capacitors C3 and C4 have a capacitance of 0.1 μF.

The outputs of the comparators U1 and U2 are supplied to a two input NOR gate U7. When the value of the integrated signal is between CompRed and CompBlue, the NOR gate U7 outputs a logic high state, otherwise, the NOR gate U7 outputs a logic low state. For example, when OutF is greater than CompRed, comparator U1 outputs a high logic state for RED otherwise, comparator U1 outputs a low logic state. Similarly, when CompBlue is greater than OutF, comparator U2 outputs a high logic state for Blue otherwise, comparator U2 outputs a low logic state. Thus, when OutF is between CompBlue and CompRed, both comparator outputs are low (Red and Blue) and accordingly, the output of the NOR gate U7 is a high logic state. Part No. 74HC02 may be used for the NOR gate U7.

When the output of the NOR gate U7 is a high logic state and the output of the AND gate U13 is also a high logic state, the output of the NAND gate U6 is low, which cause the gate driver U4 to turn the switch ON, e.g., MOSFET M1 ON.

As described above, the output of the NAND gate U6 is supplied to the gate driver U4 (MOSFET Driver). Part No. EL7212C may be used as the gate driver U4. The EL7212C is a high speed inverting gate driver. The gate driver U4 is supplied with the 15V from the housekeeping circuit. Similar to other component, a capacitor C5 is connected thereto. As illustrated, the capacitor C5 has a capacitance of 0.1 µF. In other aspects of the disclosure other drivers may be used.

The gate driver U4 outputs a Gate_Driver_Out signal to the switch 220.

As shown in FIGS. 2 and 3E, the drive circuit 35 has a switch 220. In an aspect of the disclosure, the switch 220 may comprise a MOSFET M1. The gate of the MOSFET M1 is connected to EMI protection elements include an inductor L1 and a diode D1 and a resistor R_Gate. The inductor L1 may be a ferrite bead used to reduce noise at the gate of the MOSFET M1. The diode D1 is used around the ferrite bead to reduce a likelihood of retriggering of the MOSFET M1 due to oscillation from a Miller Effect capacitance and the inductance of the ferrite bead. In other aspects of the disclosure, an insulated-gate bipolar transistor (IGBT) may be used as the switch depending on the operating frequency. For example, an IGBT may be used when operating at a frequency less than 100 kHz. In other aspects of the disclosure, an enhancement-mode GaN field effect transistor may be used. An enhancement-mode GaN field effect transistor has a high frequency operation and low losses.

As illustrated, the resistor R_Gate has a resistance of 10Ω. The diode D1 may be a Schottky Barrier Rectifier. For example, Part No. 1N5819 may be used. The output of the gate driver U4 (MOSFET driver) is supplied to the gate (Gate_Driver_Out). In an aspect of the disclosure, the MOSFET M1 is a N-channel MOSFET. For example, Part No. SPA11N60C3 may be used. The MOSFET M1 is capable of high speed switching.

As shown in FIGS. 2 and 3G, the drive circuit 35 has a run time duration circuit 230. The run time duration circuit 230 is a 555 timing circuit. The duration circuit 230 comprises 555 IC U11. For example, Part No. NE555 may be used. 5V is supplied to the Vcc and a capacitor C12 is connected from Vcc to ground. 5V is also connected to a resistive divider (voltage divider). Similar to the logic threshold generation portion, the resistive divider have three resistors with one being variable. Resistor R6 and R8 are connected in series with a potentiometer RSet555. The set point of the potentiometer RSet555 determines the timing signal, e.g., Circuit_on. For example, the set point may be 0.25 with Rt=10K. However, this set point may be varied. Additionally, the initial set point is only described for descriptive purposes and other initial set points may be used as required. Changing the position of the wiper the potentiometer RSet555 changes the duty cycle of the timing signal Circuit_on. For example, as the position of the wiper increases the resistance between terminal L and the wiper, the duty cycle of the timing signal Circuit_on increases (switch, e.g., MOSFET M1 is ON longer when the duty cycle is longer, thus the power supplied to the oscillating circuit 15 is more when the duty cycle is higher). Similarly, as the position of the wiper decreases the resistance between terminal L and the wiper, the duty cycle of the timing signal Circuit_on decrease (allowing the switch, e.g., MOSFET M1 to be switched OFF longer where the power supplied to the oscillating circuit 15 is lower than when the duty cycle of the timing signal is higher).

The total cycle period for the timing signal is T where T is determined by the following equation:

$$T=0.8(R8+\text{RSet}555+R6)C11. \tag{1}$$

The time where the timing signal will be high is $T_{on}$, where $T_{on}$ is determined by the following equation:

$$T_{on}=0.8(R8+\text{RSet}555_{L\rightarrow Wiper})C11. \tag{2}$$

The time where the timing signal will be low us $T_{off}$, where $T_{off}$ is determined by the following equation:

$$T_{off}=0.8(\text{RSet}555_{H\rightarrow Wiper}+R6)C11. \tag{3}$$

The duty cycle is $T_{on}/T$.

In an aspect of the disclosure, the timing signal Circuit_on turns high when the voltage across capacitor C11 is less than ⅓Vcc and remains high until the voltage across the capacitor C11 reaches ⅔ Vcc. Thus, in an aspect of the disclosure, the internal control signal is ⅔ Vcc. The Discharge (pin) DIS allows the capacitor C11 to discharge to ground. The charging path for capacitor C11 (which is also the voltage of the threshold (THRS) and trigger (TRIG)) is formed from resistor R8, the resistance of terminal L to wiper, diode D6. The discharging path for the capacitor C11 is formed from resistor R6, diode D7 and resistance of terminal H to wiper), which forms a path to ground through the discharge terminal (DIS). The discharge (pin) DIS is pulled to ground internally when the output OUT pin is low; otherwise the terminal is floating allowing the capacitor C11 to charge.

The run time duration circuit 230 may also act as a general reset if the drive circuit 35 reaches a safe state of the MOSFET M1 latched OFF. The time signal, e.g., output of the run time duration circuit 230 is supplied to the AND gate U13. Therefore, the output of the AND gate U13 is directly controlled by the run time duration circuit 230 as needed.

The NE555 timing circuit 230 as described generates a low frequency pulse-width-modulation PWM (lower than the frequency that the oscillating circuit 15 is oscillating at) which envelopes the primary oscillation of the oscillating circuit 15 so that very low power levels may be achieved. Other timing circuits may be used to accomplish the same function such a digital count-down timers, microprocessors with a software timer or the use of discrete (non-package components).

A digital count-down circuit uses an array of flip-flops to divide a master clock down to lower frequencies (lower than the frequency that the oscillating circuit 15 is oscillating at). By employing digital logic (e.g., flip-flops and "AND" gates), a clock oscillating at 1 MHz for example can be selected for many different lower frequencies having a large selection of duty cycle, i.e., say from 1 percent to 100 percent. This same countdown function may be accomplished using a microprocessor device in which the software is programmed to count the master clock frequency and provide an off/on signal at the lower frequency (lower than the frequency that the oscillating circuit 15 is oscillating at) with selectable duty cycle. In addition, a PWM signal can be made using a ramp or triangle wave generator (which can be constructed with discrete components) which establishes a carrier frequency (lower than the frequency that the oscillating circuit 15 is oscillating at) fed into a comparator. The second input to the comparator serves as the duty cycle adjustment and may be a static signal, a periodic signal, or a controlled voltage. The comparator action generates a modulation waveform that input into the control logic 225.

FIGS. 2 and 3C depict the oscillating circuit 15 (Tank Circuit). The oscillating circuit 15 comprises inductor L_Tank and capacitor C_Tank. The inductance and capacitance determines the oscillating frequency. The inductance and capacitance values may be set as needed based on the application. As illustrated, the inductor L_Tank has an inductance of 2 µH and the capacitor C_Tank has a capacitance of 100 nF. Thus, the resonant frequency is 0.3559 Mhz.

In an aspect of the disclosure, the oscillation has a frequency of between 25 kHz-1 MHz. In other aspects of the disclosure, the oscillation may have a frequency of at least 180 kHz. Additionally, in other aspects, the oscillation may have a frequency of less than 10 MHz. The oscillation may have a frequency of less than 2 MHz.

The oscillating circuit 15 oscillates over a period of time. Using a conventional drive circuit the oscillation dampens over time and will reach a level where the oscillating circuit 15 no longer oscillates. However, in accordance with aspects of the disclosure, the drive circuit 35 has a switch, e.g., MOSFET M1 which is used to pull the voltage of SW to ground, e.g., a low state, to continuously drive the oscillation (when the switch, e.g., MOSFET M1 is switched ON). By pulling the voltage of SW to ground, current flows from TOP (the first terminal) to SW (the second terminal) through the inductor L_Tank and capacitor C_Tank, effectively recharging the oscillation.

The timing that the switch, e.g., MOSFET M1 is switched ON impacts the efficiency of the drive circuit 35 and reduces losses. Switching too early would release too much current from the capacitor C_Tank wasting energy and switching too late would work against the current in the inductor L_Tank. Therefore, in accordance with aspects of the disclosure, the timing for switching the switch, e.g., MOSFET M1 ON is at least based on crossings of voltages TOP_Ref and SW_Ref to keep the oscillating circuit 15 with minimal losses. For example, in an aspect of the disclosure, the timing is when voltage SW reaches its minimum, which is also the time halfway between the crossing of when the voltage SW drops below voltage TOP and when voltage SW rises above voltage TOP.

As described above, TOP_ref is a scaled voltage of TOP (first terminal) and SW_ref is a scaled voltage of SW (second terminal). The scaling is to provide voltages into the first comparator U8 within its operating range. For example, the operating range for the first comparator U8 is less than 4.5V.

The first comparator U8 outputs a square waveform which is high when voltage SW_ref is less than voltage TOP_ref and which is low when voltage SW_ref is greater than TOP_ref (when the oscillating circuit 15 oscillates). In an aspect of the disclosure, the integrator (R_Filter and C_Filter, e.g., first order RC filter) modifies the square waveform into a triangle waveform having the same frequency. This enables a more accurate control of the circuit because of being able to compare voltage thresholds with a voltage level as opposed to a binary voltage output.

Figure 4A:
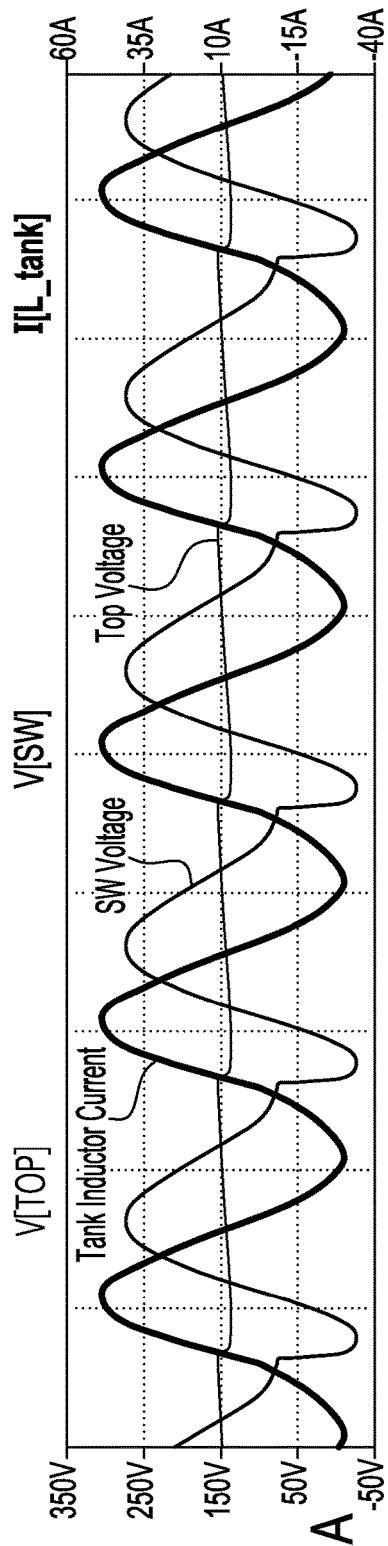
FIGS. 4A-4C depicts waveforms of the drive circuit, where
Figure 4B:
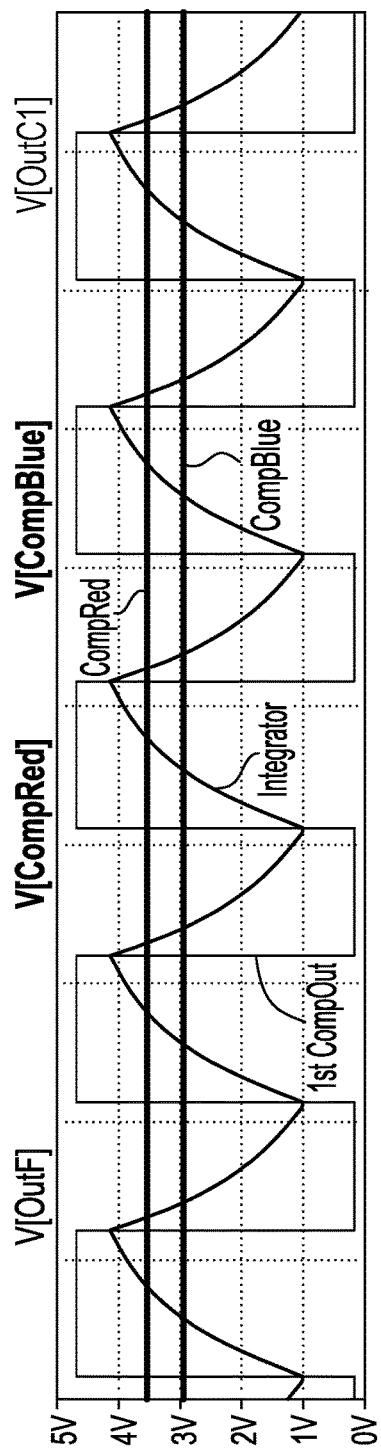
Figure 4C:
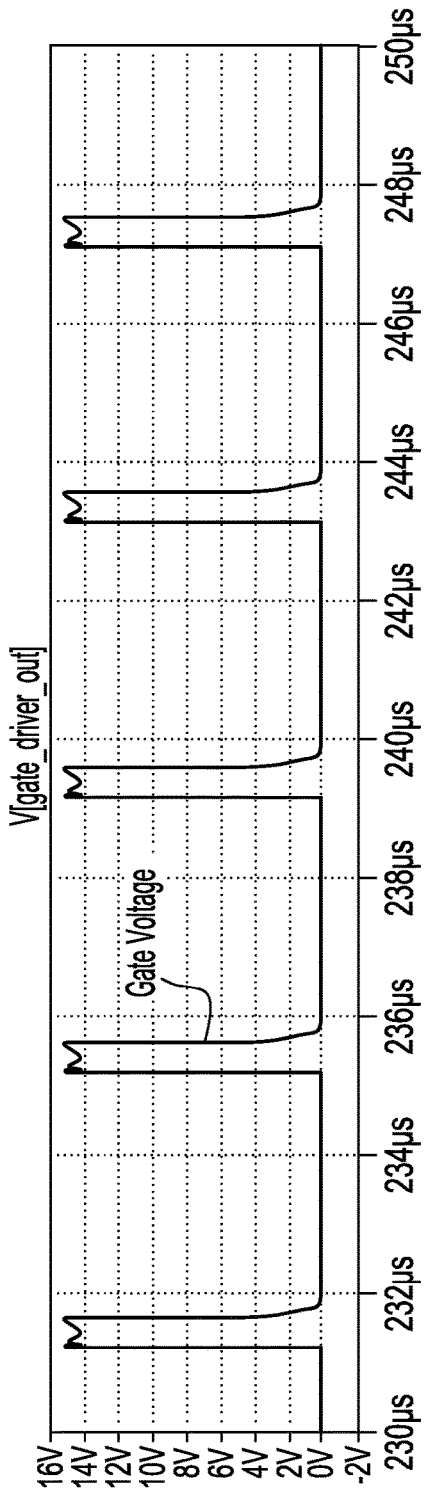

FIGS. 4A-4C depict waveforms of the drive circuit which were the result of SPICE simulation of the circuit. A transient analysis was used with a 500 ms stop time and a maximum timestep of 1 µs. FIG. 4A shows the current in the inductor (Tank Inductor Current), which is a function of the difference in voltage between voltage Top (first terminal) and voltage SW (second terminal). The right axis of the figure shows the values of current. FIG. 4A also shows the TOP voltage and SW voltage. The left axis in the figure shows the values in voltage. As seen in FIG. 4A, the TOP voltage is rectified to be about 168 VDC (may rise to slightly higher) whereas the SW voltage oscillates about the voltage of the TOP voltage.

The effect of switching MOSFET M1 ON, e.g., pulling SW to ground is shown by the inflection point on FIG. 4A, where there is a sharp decrease in the voltage SW. This timing matches with the gate voltage of the MOSFET M1 being higher than its threshold as shown in FIG. 4C.

FIG. 4B shows the output of the first comparator U8 where the square waveform is high when the SW_Ref drops below TOP_Ref and low vice versa. The integrator (resistor R_Filter and capacitor C_Filter) transforms the square waveform into a triangle waveform (shown in FIG. 4B) for adjustment of the duty cycle location and duration. In an aspect of the disclosure, the voltage thresholds (CompRed and CompBlue) govern the duty cycle and the thresholds may be fixed. In other aspects of the disclosure, as will be discussed below, the voltage thresholds may be varied via a feedback network for the heating system based on sensor output. The voltage thresholds (CompRed and CompBlue) are also shown in FIG. 4B. CompBlue is less than CompRed. In this simulation CompBlue was 3V and CompRed was 3.65V.

FIG. 4C shows the MOSFET driver's output (input to the gate). When the triangle wave's voltage (output of the integrator) is rising between the two voltage thresholds, the gate drive's output becomes high, in order to trigger the MOSFET M1 to act as a switch and reach a full on state rapidly. The drive circuit 35 prevents the triggering of the MOSFET M1 as the triangle wave's voltage is decreasing by using the NAND gate U6. This prevents the drive circuit 35 from retriggering which would cause incorrect operation of the oscillating circuit 15.

In an aspect of the disclosure, the drive circuit's power delivered to the inductor L_Tank can be controlled to less than 100 watts. Further reduction in power can be accomplished by controlling the gross off-on period of operation (using the run time duration circuit 230 because the load has a time constant of 50 seconds or longer depending on the mass of the porous graphite foam conductor 14 used.

A controller 30 used herein refers to any component or group of components that individually or collectively control the drive circuit 35 and LED lights 45. For example, the controller 30 may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory.

The memory may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis.

The controller 30 has a control set point for the output of the heating system 1. For example, the control set point may be a set temperature. This control set point may be predetermined prior to installation. In other aspects of the disclosure, the control set point may be customized to a particular application and set after installation. In other aspects of the disclosure, the control set point may be periodically adjusted or changed as needed. In another aspect of the disclosure, the system 1 further comprises a user interface (not shown) such as a temperature dial. The operator of the heating system 1 may set the temperature to any target temperature as desired. In other aspects of the disclosure, the operator may set a timer and the heating system 1 may be ON based on the time set for the timer.

The use of an AC induction field to heat the porous graphite foam conductor 14 provides for an efficient instant on-demand water heaters. Other heat-consuming functions such as, without limitation, hot water dispensers like a single coffee cup or hot cocoa maker may be also achieved. The system could be used at the source of sinks in commercial buildings, and wherever rapid supplies of hot water are required. Once the target or control set point is input, the controller 30 sets the timing signal Circuit_on and/or voltage thresholds (CompRed and CompBlue) based on the target or control set point. In an aspect of the disclosure, a lookup table may be stored in memory having temperature and timing signal and voltage thresholds values associated therewith. Additionally, the timing signal Circuit_on and/or voltage thresholds (CompRed and CompBlue) may be also based on expected flow rate. In an aspect of the disclosure, a flow rate table may be stored in memory in addition to temperature. Once the timing signal and/or voltage thresholds are set, the controller 30 may control the drive circuit 35 at the set points.

During operation, the controller 30 may receive signals from the one or more temperature sensors 20, 22 and a flow rate sensor to determine if the actual fluid temperature at the outlet 16 (e.g., T2) equals the target temperature or if the actual flow rate equals the expected flow rate. The controller 30 may adjust the timing signal and/or voltage thresholds based on the received signals from the sensors.

In an aspect of the disclosure, a proportional integral control (PI controller) may be used. In other aspects of the disclosure, a proportional integral derivative (PID controller) may be used. For example, the comparison of the control set point and the value detected generates an error signal. The error signal may be used by the controller 30 to change at least one of the voltage thresholds (e.g., CompRed and/or CompBlue). For example, if the temperature sensor 22 detects that the temperature of the fluid at the outlet 16 (T2) is higher than the control set point, e.g., target temperature then the error signal causes the controller 30 to adjust at least one of the voltage thresholds CompRed and/or CompBlue such that the switch, e.g., MOSFET M1 is OFF for a longer period of time. In other words, the controller 30 adjusts one or both of the voltage thresholds such that they are closer to each other. Similarly, if the temperature sensor 22 detects that the temperature of the fluid at the outlet 16 (T2) is lower than the control set point (target temperature), then the error signal causes the controller 30 to adjust at least one of the voltage thresholds CompRed and/or CompBlue such that the switch, e.g., MOSFET M1 is ON for a longer period of time. In other words, the controller 30 adjusts one or both of the voltage thresholds such that they are further away from each other. For example, the controller 30 controls the potentiometer(s) RSetRed and/or RSetBlue to change the resistance, which in turn changes the values of the voltage thresholds CompRed or CompBlue. A similar feedback adjustment may be made if the actual flow rate is higher/lower than the expected flow. U.S. Pat. No. 9,739,501 describes a relationship between the temperature change(s), power level and flow rates for different porous graphite foam conductors 14, which is incorporated herein by reference. In other aspects of the disclosure, the potentiometer(s) RSetRed and/or RSetBlue may be replaced with other components to change CompRed or CompBlue and therefor control the ON time of the switch, e.g., MOSFET M1. For example, a voltage control signal from a digital to analog controller may be used. For example, a microcontroller device or a standalone unit may be used, such as an integrated circuit (IC) or an ASIC.

In other aspects of the disclosure, where the voltages CompRed or CompBlue is fixed, the potentiometer(s) RSetRed and/or RSetBlue may be replaced with fixed value resistors.

In other aspects of the disclosure, instead of or in addition to adjusting the voltage thresholds, CompRed and/or CompBlue, the controller 30 may adjust the timing signal output from the run time duration circuit 230 (e.g., Circuit_on) based on the detected temperature by one or more temperature sensors 20, 22. The adjustment to the timing signal is similar to the adjustment to the voltage thresholds. For example, if the temperature sensor 22 detects that the temperature of the fluid at the outlet 16 (T2) is higher than the control set point (target temperature), then the error signal causes the controller 30 to adjust the timing signal (Circuit On), such that the switch, e.g., MOSFET M1 is OFF longer, e.g., lowers the duty cycle. This may also be executed by adjusting the resistance of the potentiometer RSet555. Similarly, if the temperature sensor 22 detects that the temperature of the fluid at the outlet 16 (T2) is lower than the control set point (target temperature), then the error signal causes the controller 40 to adjust the timing signal (Circuit_on), such that the switch, e.g., MOSFET M1 is ON for a longer period of time, e.g., raises the duty cycle.

In other aspects of the disclosure, both the temperature at the inlet 12 (T1) and the temperature at the outlet (16) (T2), may be used to determine the timing signal and/or voltage thresholds. For example, a look up table (LUT) may be stored in memory having set points for the timing signal and/or voltage thresholds for specific temperatures at the inlet 12 (T1) and target temperatures T2, e.g., temperature of the fluid at the outlet 16. The initial set point may be determined by receiving detected value(s) from the temperature sensor 20 (T1) and the target temperature and looking up the set points in the LUTs.

In another aspect of the disclosure, the memory may have a preset temperature threshold for the temperature at the inlet 12 (T1). When the temperature sensor 20 detects that the temperature of the fluid at the inlet 12 (T1) is less than the preset temperature threshold, the controller 30 is configured to turn the drive circuit 35 ON at a preset set point, e.g., predetermined timing signal and voltage thresholds. When the temperature sensor 20 detects that the temperature of the fluid at the inlet 12 (T1) is greater than the preset temperature threshold, the controller 30 is configured to either turn the drive circuit 35 OFF or maintain the drive circuit 35 OFF. For example, the switch 32 automatically turns ON/OFF based on the temperature detection without requiring manually actuation of the switch 32.

In another aspect of the disclosure, when the flow sensor (not shown) detects a flow at the inlet 12, the switch 32 is automatically turned ON and thus, the controller 30 turns the drive circuit 35 ON.

In other aspects of the disclosure, the type of fluid may also affect the timing signal and/or voltage thresholds. For example, a look up table may be stored having set points for the timing signals and/or voltage thresholds for different types of fluids (gases, water, etc. . . . ).

Other sensed values may be used to control the timing signal and/or voltage thresholds.

The porous graphite foam conductor 14 may be derived from any suitable carbonaceous starting material and may be prepared by any suitable process. In one aspect the carbon foam is prepared from a pitch selected from the group consisting of petroleum-derived mesophase pitch, petroleum derived isotropic pitch, coal-tar-derived mesophase pitch, synthetic mesophase pitch, and synthetic isotropic pitch. An example of a process of making the porous graphite foam conductor 14 is described in U.S. Pat. No. 9,739,501 which is incorporated herein by reference.

The porous graphite foam conductor 14 may have a thermal conductivity of at least 40 W/mK. In other aspects of the disclosure, the porous graphite foam conductor 14 may have a thermal conductivity of between 40-100 W/mK. Also in other aspects of the disclosure, the porous graphite foam conductor 14 may have a thermal conductivity of at least 220 W/mK. The porous graphite foam conductor 14 may have a thermal conductivity of between 220-240 W/mK.

Further, in other aspects of the disclosure, the specific thermal conductivity of the porous graphite foam conductor 14 may be at least 109 W cm$^3$/mKg. In other aspects of the disclosure, the specific thermal conductivity of the porous graphite foam conductor 14 may be between 109-200 W cm$^3$/mKg. The porous graphite foam conductor 14 may have a specific thermal conductivity greater than four times that of copper. The porous graphite foam conductor 14 has been calculated to be over 95% efficient in the conversion of electricity to heat.

For manufacturing systems that cycle hot objects such as injection molding, composite tooling, and the like. The core of the device could be the porous graphite foam conductor with an internal AC induction coil (L_Tank). At times that the system needs to be hot, the power is energized and the porous graphite foam conductor will heat extremely fast. When the system needs to be cooled, the power is turned off, and air or another cooling fluid is passed through the pores of the porous graphite foam conductor to cool the system. This will allow devices to cycle much faster and improve throughput and reduce costs per part.

In an aspect of the disclosure, the porous graphite foam conductor 14 may have a porosity of at least 69%. In other aspects of the disclosure, the porous graphite foam conductor 14 may have a porosity of at least 85%. In other aspects of the disclosure, the porous graphite foam conductor 14 may have a porosity of between 69%-85%. The porosity may be as high as 89% and as low as 67%. The foam may have interconnected or isolated cells (pores). Interconnected pores allow fluid and gases to pass though the foam and allow the fluid or gas to access the high surface area of the foam. This leads to efficient transfer of thermal energy between the foam and media.

The porous graphite foam conductor 14 heats faster than other carbon structures such as the blocks of graphite typically used as a susceptor, as well as carbon fibers. Typical graphite skin penetration is about 11 mm at about 180 kHz (for an 8000 micro-ohm-cm resistivity material), although this will vary with frequency and power. Skin depth is a strong function of frequency but not of power and varies with porosity and resistivity of the material. The total intensity is a function of power; however, the distribution of Eddy currents across the surface is not strongly related to power.

The wall thickness of a porous graphite foam conductor 14 may be between about 50-100 microns. The wall thickness will depend on the actual foam structure. The effective depth of penetration of the foam may therefore in one example be up to 11 mm using AC Induction heating.

Other aspects and properties of a porous graphite foam conductor 14 which may be used in the system 1 have been described in U.S. Pat. No. 9,739,501, which is incorporated herein by reference.

FIGS. 5-8 depict examples of the design of the inductor L_Tank. In an aspect of the disclosure, the induction coil(s) is designed to minimize the amount of electrical resistance because internal coil resistance causes heating according to the same relationship. A coil is selected to exhibit the lowest resistance possible at the working frequency to minimize the parasitic power dissipation and present itself as a specific inductance value so that the combination of its inductance the accompany capacitor resonate at the desired frequency, $$f = \frac{1}{2\pi\sqrt{LC}}. \tag{4}$$

Figure 6:
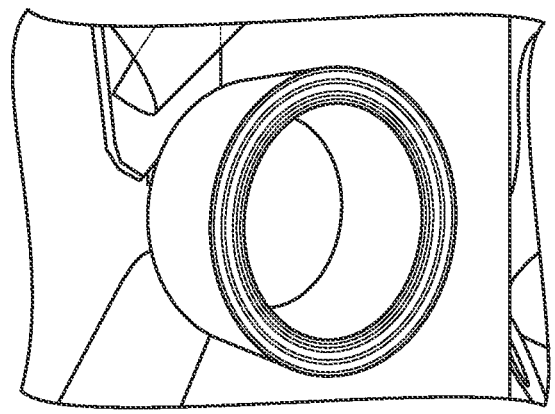
FIG. 6 is an illustration of another example of the inductor for the oscillating circuit in accordance with aspects of the disclosure.
Figure 5:
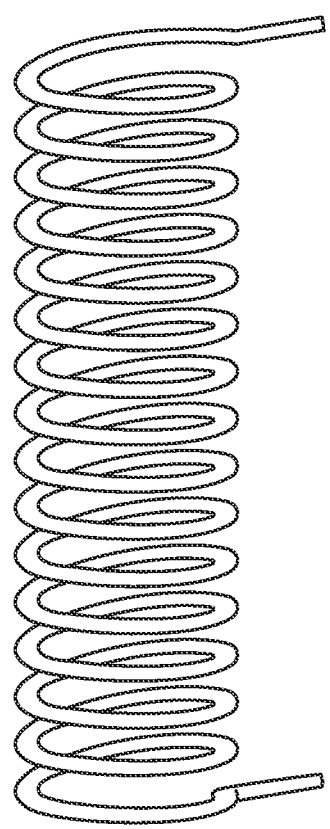
FIG. 5 is an illustration example of the inductor for the oscillating circuit in accordance with aspects of the disclosure.
Figure 7:
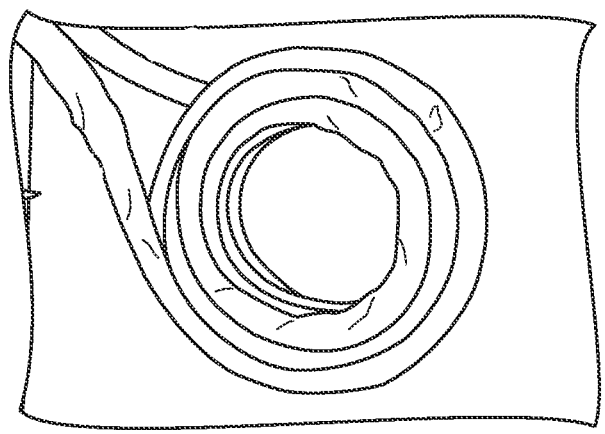
FIG. 7 is an illustration of another example of the inductor for the oscillating circuit in accordance with aspects of the disclosure.

In an aspect of the disclosure, the inductor L_Tank is a solenoid (shown in FIGS. 5-7). As depicted in FIG. 5, the solenoid, e.g., coil, is a single-layer with multiple turns. In other aspects of the disclosure, the solenoid may have multiple layers as shown in FIG. 6. The solenoid shown in FIG. 6 has an open bore. The sealed enclosure 5 may be inserted in the open bore.

Figure 8:
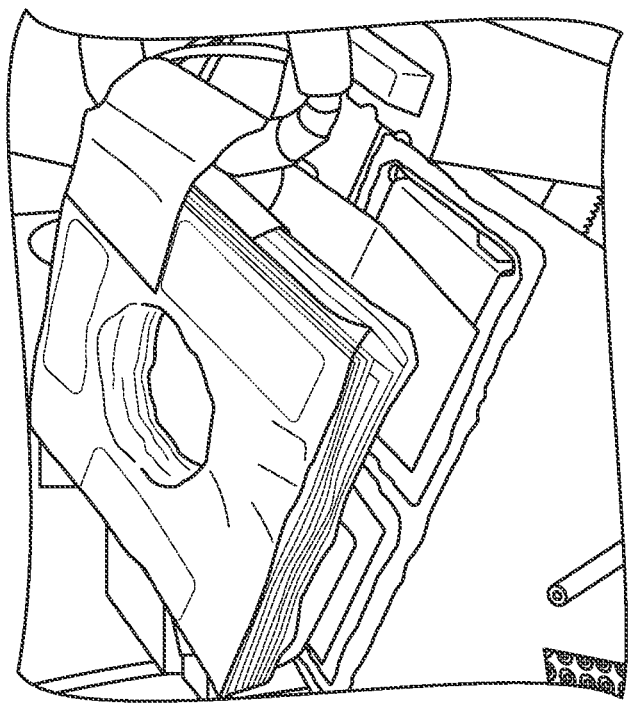
FIG. 8 is an illustration of another example of the inductor for the oscillating circuit in accordance with aspects of the disclosure.

In other aspects of the disclosure, the solenoid may have multiple layers and multiple turns as shown in FIG. 7. The solenoid shown in FIG. 7 also has an open bore. The sealed enclosure 5 may be inserted in the open bore. In another aspect of the disclosure, the coil may be a flat-wound coil as shown in FIG. 8, such as a Bitter coil. In another aspect of the disclosure, the coil may be spiral wound with no bore.

Other examples of the design of the coils including number of turns, terminals, tap positions, coil size and diameter are described in U.S. Pat. No. 9,739,501, which is incorporated herein by reference. For example, the number of turns may vary from 3 to 8 turns.

In an aspect of the disclosure, the material used for the inductor L_Tank is selected to minimize the series resistance. For example, in an aspect of the disclosure, copper may be used. Copper has a high electrical conductance. In other aspects of the disclosure, aluminum may also be used. In others aspects of the disclosure, silver may be used. Silver has a higher conductivity than copper but is more expensive. The thickness of the copper in the coil is selected by accounting for the skin effect.

Figure 9:
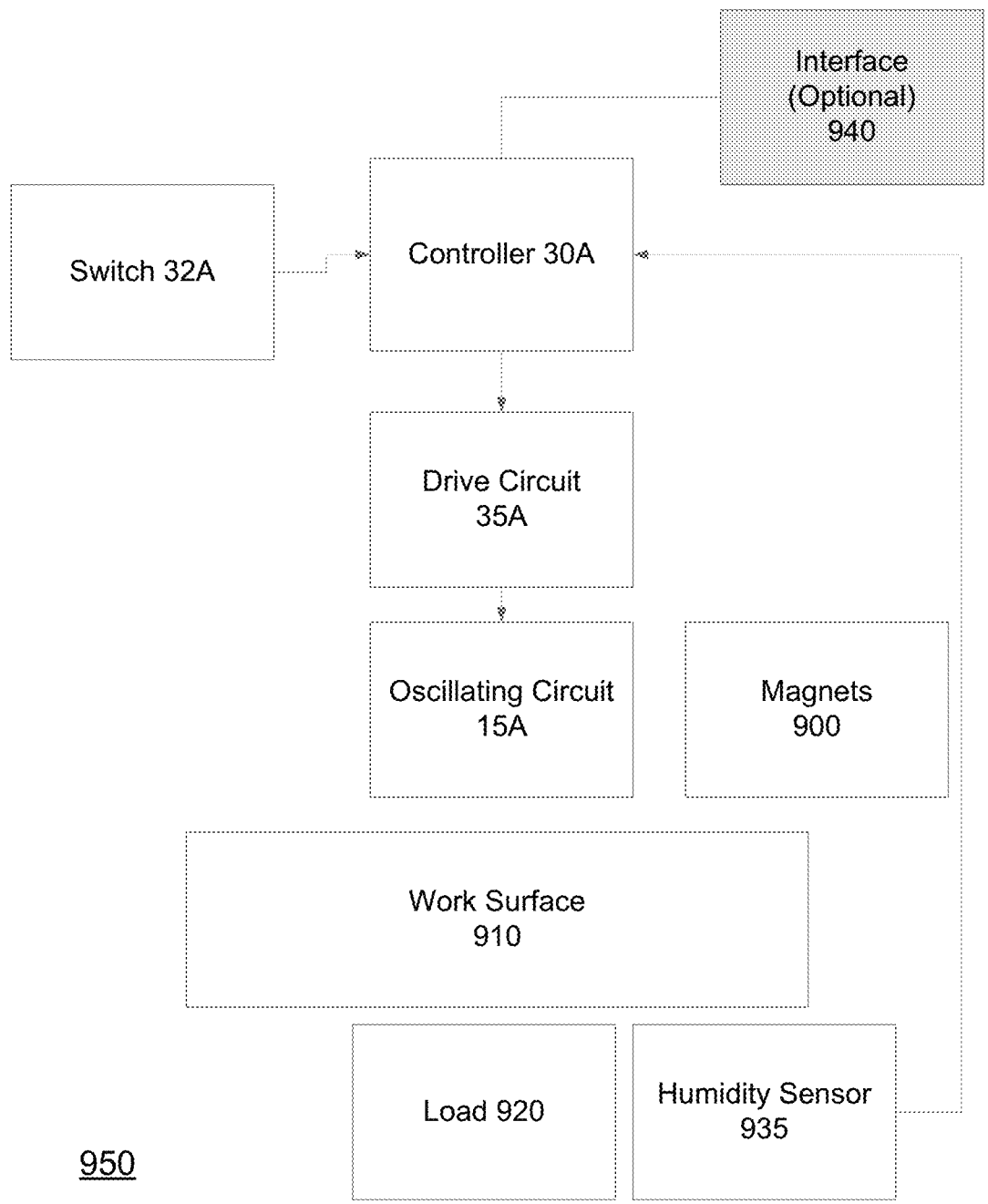
FIG. 9 is a block diagram of an electromagnetic acoustic transducer (EMAT) system in accordance with aspects of the disclosure.

FIG. 9 is a block diagram of an electromagnetic acoustic transducer (EMAT) system 950 in accordance with aspects of the disclosure. In accordance with aspects of the disclosure, the EMAT system 950 may be used for drying applications to dry a load. The EMAT system 950 is clean, efficient and environmentally friendly. In an aspect of the disclosure, the EMAT system 950 may be incorporated into a dryer, such as, but not limited to blower and lint filter dryers, drum shroud dryers, integrated drum shroud dryers, wringer type dryers and sandwich press/iron dryers. The dryers having an EMAT system 950 in accordance with aspects of the disclosure, may be used in the clothing industry, paper industry, food industry, mining industry, environmental industry and in chemical manufacture and other industries. An EMAT device included in the system 950 converts electrical energy into high frequency mechanical waves. For example, the high frequency mechanical wave may include ultrasonic frequencies.

The drying effect is achieved by vibrating a load 920 (object to be dried) using the resonance of one or more EMAT device(s). The moisture is converted into a cool mist. The EMAT system 950 comprises an EMAT device. The EMAT device comprises one or more magnets 900, an induction coil (part of the oscillating device 15A) and a working surface 910. The working surface 910 may be a vibrating plate.

The induction coil is used to transfer energy from the coil current to the working surface 910. The magnets 900 generate a static (DC) magnetic field. This static (DC) magnetic field penetrates the surface in which a force is applied, e.g., working surface 910. In an aspect of the disclosure, the induction coil current and the static (DC) magnetic field are placed orthogonal to each other. A Lorentz force F generated as a result of electric current density and static (DC) magnetic field. The alternating magnetic field of the induction coil generates an eddy current. The Lorentz force F is generated orthogonal to the alternating magnetic field (Magnetic Induction B) and current.

The shape of the working surface 910 may be round such as a disk, or a square. In another aspect of the disclosure, the shape may be hexagonal. The working surface 910 may have a thickness of 0.025 to 0.5 mm. In other aspects of the disclosure, the working surface 910 may have a thickness of 0.025 to 1 mm. The working surface 910 may be made of a highly electrically conductive, noncorrosive and high strength material. For example, a stainless steel material may be used, such as a 400-series. In an aspect of the disclosure, the material is ferromagnetic. The material may be stiff and have a high Young's modulus. The reason for a highly electrically conductive material is so that little power is lost to Joules heating from the induced eddy currents. Other material properties include low corrosion in aqueous environments at less than 100° Celsius although a nickel or chromium coating may be sufficient to prevent oxidation. Additionally, in an aspect of the disclosure, a high permeability (susceptibility) material is needed and should be easy to magnetically coerce (low coercivity values). Additionally, the material's saturation value may need to be high due to the value of the static (DC) magnetic field.

In an aspect of the disclosure, the working surface 910 has one or more vapor holes. These vapor holes may be shaped as slots, perforations or slits in the working surface 910. The vapor holes are configured to allow for the water droplets to go through (through the vibration plate) away from the load 920. This prevents water droplets from remaining on the contacting surface of the working surface (vibration plate). The vapor holes may be 3 to 50 μm in diameter. In other aspects of the disclosure, the vapor holes may be 3 to 100 μm. The size of the vapor holes may be based on the operating frequency. The specific sizes described herein are included for descriptive purposes only and the size of the holes may be different and application based. The vapor holes may be laser punched into the working surface 910. The working surface 910 may have an array of vapor holes having 4×4 number of holes.

The magnet(s) 900 may be made of NdFeB. In other aspects of the disclosure, other materials may be used. For example, a magnet made of samarium cobalt, ferrite and alnico may be used. In other aspects of the disclosure, an electromagnet may be used. Various shapes and configurations of the magnet(s) 900 may be used, examples of which are shown in FIGS. 11-17. For example, a magnet 900 may be a ring magnet, a cylinder magnet, or a bar magnet. The magnet 900 may be contiguous or a split type.

Power is inductively supplied to the EMAT device from a drive circuit 35A. The drive circuit 35A has a similar topology as the drive circuit 35 described in detail above and will not be described again in detail. However, the values for the components may be different as well as the voltage thresholds (e.g., CompRed and CompBlue) and the timing signal Circuit_on. Also, the load model would be different. Instead of resistor R_Foam and inductor L_Foam, the load model would be resistor R_workingload and inductor L_workingload.

The voltage thresholds CompRed and CompBlue described above were designed for the porous graphite foam conductor 14 to generate a specific amount of heat (heating the fluid to a specific temperature). Similarly, the timing signal was designed for the porous graphite foam conductor 14 to generate a specific amount of heat (heating the fluid to a specific temperature).

In contrast, in this aspect of the disclosure, the voltage thresholds CompRed and CompBlue and timing signal Circuit_on are set to generate a specific amount of vibrations (acceleration and/or amplitude). Acceleration is a function of amplitude and frequency. The amplitude is based on the power delivered. In an aspect of the disclosure, the acceleration amplitude(s) of the vibration may be ten or more microns.

For example, the drive circuit 35A is configured to cause the working surface 910 to have an acceleration of greater than 34,000 m/s$^2$, which is the critical acceleration for mechanical separation of water from a load, such as a fabric. In an aspect of the disclosure, the power acceleration is greater than 2 times the critical acceleration. For example, the power acceleration is 68,000 to 170,000 m/s$^2$.

Accordingly, the voltage thresholds CompRed and CompBlue and timing signal Circuit_on may be initially set based on the size of the working surface 910, induction coil type, number of EMAT devices, type of load, and initial wetness of the load to deliver a target amplitude which in turn changes the acceleration. For example, when using a small array of EMAT devices, the power may be 5 to 20 Watts; however, larger array surfaces may used higher power such as 200 to 1000 Watts.

The drive circuit 35A drives (powers) an oscillating circuit 15A which includes the induction coil. The resonant frequency for the oscillating circuit 15A is based on the inductance of the induction coil and the capacitance of the capacitor coupled to the induction coil. In an aspect of the disclosure, the resonant frequency may be 40 Khz to 1 Mhz. The resonant frequency may be selected based on a type of load. For example, in an aspect of the disclosure, the memory may store a look up table comprises different types of loads and the optimal resonant frequency associated with the types.

In another aspect of the disclosure, the resonant frequency may be adjusted (by changing the capacitance) based on a feedback signal received from a sensor, such as a humidity sensor 935.

In another aspect of the disclosure, multiple frequencies may be used sequentially used. In accordance with this aspect of the disclosure, the drive circuit 35A comprises a plurality of capacitors selectively couplable to the induction coil. The controller 30A causes one or more of the capacitors to be selectively coupled to the induction coil to form the resonant circuit 15A. For example, the resonant frequency may be controlled to alternate as needed such that one frequency may move the load 120 while the other nebulizes the fluid.

In another aspect of the disclosure, multiple frequencies may be simultaneously used. In this aspect of the disclosure, multiple oscillating circuits 15A may be used and respectively coupled to different drive circuits 35A. The drive circuits 35A may be independently operated by the controller 30A.

In other aspects of the disclosure, multiple frequencies may be intentionally achieved by using the fundamental frequency of the run time circuit 230. The frequency of the timing signal (PWM), which is lower than the resonant frequency of the oscillating circuit 15A is injected into the resonance oscillation of the oscillating circuit 15A. Thus, the working surface 910 (e.g., vibrating plate (steel disk)) experiences both the oscillation of the L_Tank and C_Tank (LC resonance) but also the amplitude modulation by the lower frequency caused by the timing signal. The LC resonance acts as a carrier wave, where the timing signal Circuit_on is the modulation. The frequency of the run time circuit 230 may be adjusted by varying any of the external resistors and capacitor C11. Thus, a second frequency may be controllable by controlling the frequency of the timing signal Circuit_on.

In other aspects of the disclosure, multiple frequencies may be achieved by adjusting the duty cycle of the timing signal Circuit_on over time.

In other aspects of the disclosure, multiple frequencies may be achieved by adjusting the voltage of CompRed and CompBlue. For example, a controller 30A may adjust the potentiometer as needed over time. The LC resonance acts as a carrier wave and the oscillations of the CompRed and CompBlue voltages become the modulated signal. In other aspects of the disclosure, a controller controlled potentiometer may be replaces with an oscillator such as a RC oscillator, an LC oscillator, PZT oscillator or a Voltage controlled oscillator (VCO).

In other aspects of the disclosure, a plurality of run time duration circuits 230 may be used. In this aspect of the disclosure, each run time duration circuit has its own fundamental frequency. The LC resonance of the oscillating circuit 15A acts as the carrier waves, where each timing signal is the respective modulation.

The controller 30A turns a drive circuit 35A ON and OFF and may be used to adjust a timing signal Circuit_on and voltage thresholds CompRed and CompBlue to control the power supplied to the oscillating circuit 15A (amplitude and in turn acceleration).

The system 950 further comprises a switch 32A. The switch 32A is used to turn ON/OFF the EMAT system 950. The switch 32A is electrically coupled to the controller 30A. The switch 32A may be manually operated or may be electrically operated as by a solenoid and controlled by a controller 30A. In other aspects of the disclosure, multiple switches 32A may be used, one for each EMAT device. This would allow the controller 30A to selectively turn on one or more EMAT devices at a given time.

Similar to above, the controller 30A refers to any component or group of components that individually or collectively control the drive circuit 35A. For example, the controller 30A may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory.

The memory may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis.

The controller 30A has a control set point for the output of the EMAT system 950A. This control set point may be based on one or more of the factors described above. This control set point may be predetermined prior to installation. In other aspects of the disclosure, the control set point may be customized to a particular application and set after installation. In other aspects of the disclosure, the control set point may be periodically adjusted or changed as needed. In another aspect of the disclosure, the system 1 further comprises a user interface 940. The user interface 940 may be a touch screen or a dial, a push button, timer or other device. For example, the operator may be able to identify the type of load or the humidity level and thus control the acceleration of the working surface 910 (via the power supplied by the drive circuit 35A).

The EMAT system 950 further comprises a humidity sensor 935. The humidity sensor 935 is electrically coupled to the controller 30A. Any type of humidity sensor 935 may be used such as a capacitive, resistive or thermal conductivity sensor. The signal from the humidity sensor 935 may be used to set the control set point for the voltage thresholds CompRed and CompBlue and the timing signal Circuit_on (both initial set point and during operation). Thus, the humidity sensor 935 may provide wetness feedback to adjust the amount of vibration.

In other aspects of the disclosure, other types of sensors may be included as feedback or for initial control. For example, a pressure or a force sensor may be used to turn ON the drive circuit 35A (automatically control the switch 32A). In the EMAT system 950, the drying process occurs only when there is direct contact between the load 920 and the EMAT device (working surface 910). In an aspect of the disclosure, the pressure sensor or the force sensor may be positioned on the working surface 910. When the load 920 is in contact with the working surface 910, the contact is detected by the pressure sensor or the force sensor. The pressure sensor or the force sensor transmits a signal to the controller 30A, which turns ON a respective switch 32A associated with the EMAT device (having the working surface 910 in contact with the load 920).

Additionally, or instead of using the humidity sensor 935, the force sensor may be used to detect the weight of the load. The weight of the load may indicate the wetness of the load 920. As the load dries, the weight of the load changes, e.g., decreases, as a result of the liquid being removed. Accordingly, the controller 30A uses the signal received from the force sensor also as a feedback signal to adjust the voltage thresholds CompRed and CompBlue and the timing signal Circuit_on as needed to efficiently remove a liquid from the load 920. The controller 30A may also use the signal received from the force sensor to determine when to shut OFF the drive circuit 35A (automatically control the switch 32A). This may prevent over drying of the load 920. For example, when the signal received from the force sensor (or humidity sensor 935) indicates that the wetness is less than a preset threshold, the controller 30A shuts the EMAT device(s) (system) OFF by automatically controlling the switch 32A.

The specific feedback control implemented by the controller 30A may be application specific. For example, in some aspects of the disclosure, when a load 920 is initially detected, the controller 30A may set the control set point (voltage thresholds and timing signal) such that the power supplied to the oscillating circuit 15A is the highest for the specific drying application and as the load 920 becomes drier, the controller 30A reduces the power supplied to the oscillating circuit 15A. In other aspects of the disclosure, when a load 920 is initially detected, the controller 30A may set the control set point (voltage thresholds and timing signal) such that the power supplied to the oscillating circuit 15A starts off low and increases as the load 920 becomes driers, until the preset threshold and then is shut OFF.

In an aspect of the disclosure, the memory stores a look up table (LUT). The LUT comprises voltage thresholds CompRed and CompBlue and timing signal Circuit_on associated with a humidity detection or force detection. The controller 30A upon receipt of a detection signal from the sensor (humidity sensor 935, force sensor or other sensor), looks up the voltage thresholds CompRed and CompBlue and timing signal Circuit_on corresponding to the detected value and set the same as the voltage thresholds CompRed and CompBlue and timing signal Circuit_on to be used. This is achieved by adjusting the respective potentiometers as needed. The values (e.g., voltage thresholds CompRed and CompBlue and timing signal Circuit_on) may be continuously updated using the detection signal. In other aspects of the disclosure, the LUT may also include a type of load, such as fabric type, thickness, weight, etc. In this aspect of the disclosure, the controller 30A retrieves the voltage thresholds CompRed and CompBlue and timing signal Circuit_on based on either the detection signal from the sensor or operator input using the user interface 940. In other aspects of the disclosure, the LUT may also input target acceleration power, e.g., $m/s^2$, or amplitude, which may also be associated with type of load or the detection signal.

Since the acceleration power, e.g., $m/s^2$, is proportional to the power supplied and frequency, to increase the acceleration power, the switch, e.g., MOSFET M1 is turned ON longer (at the same frequency). To decrease the acceleration power, the switch, e.g., MOSFET M1 is turned ON shorter (at the same frequency). The ON time of the switch is controlled by adjusting the voltage thresholds and/or timing signal is a similar manner as described above. For example, by adjusting one or more voltage thresholds to be closer to each other, the switch, MOSFET M1 is ON shorter and correspondingly by adjusting the one or more voltage thresholds to be further from each other, the switch, e.g., MOSFET M1 is ON longer. Similarly, by adjusting the duty cycle of the timing signal, the switch, e.g., MOSFET M1 may be turn ON longer and shorter.

Figure 10:
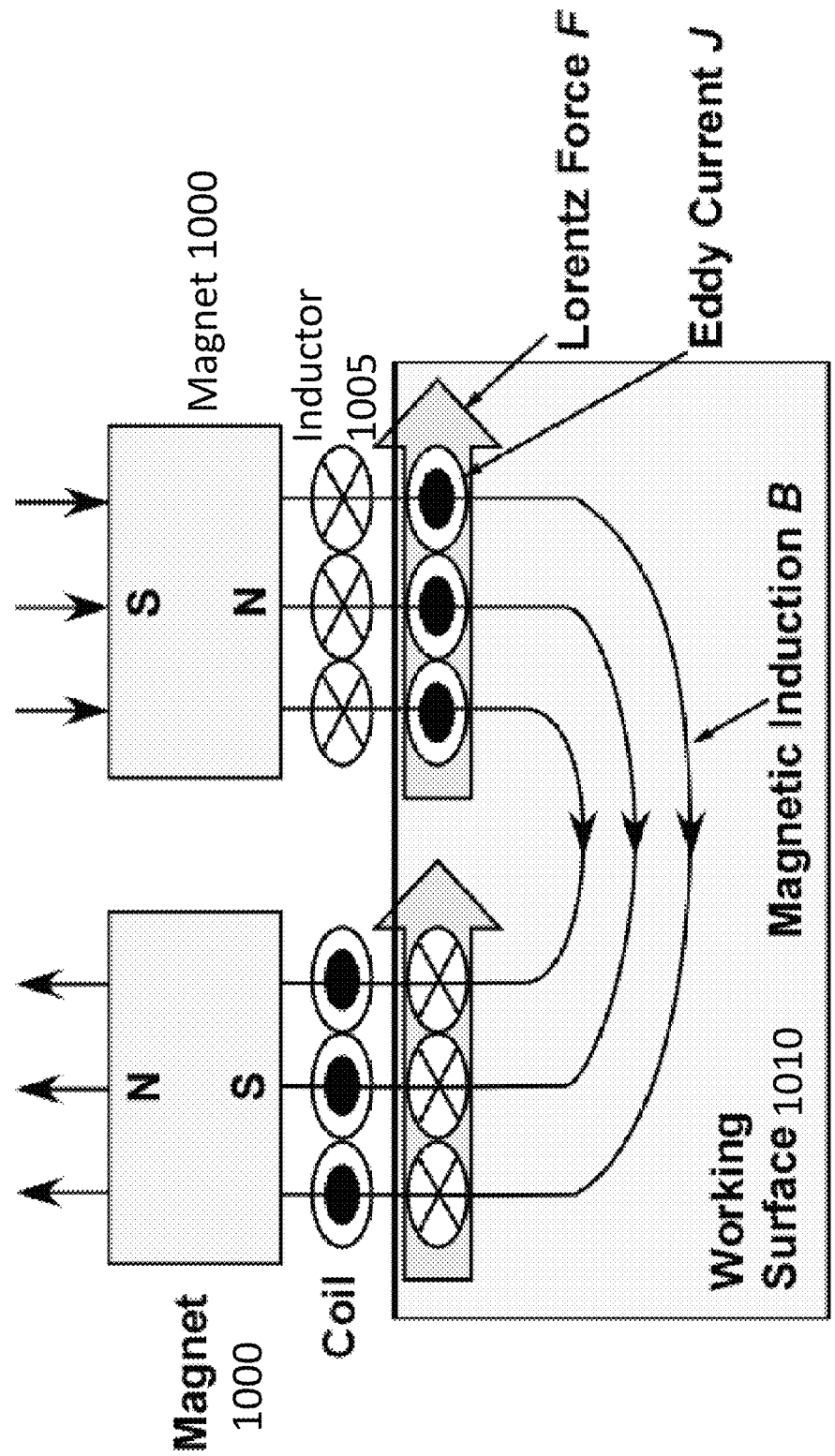
FIG. 10 is a sectional view of an example of an EMAT device in accordance with aspects of the disclosure showing a relationship between magnets, an inductor and a working surface.

FIG. 10 is a sectional view of an example of an EMAT device in accordance with aspects of the disclosure. As shown, the EMAT device comprises magnets 1000. Each magnet has opposite polarity. The magnet on the left, the North "N" is on top and South "S" is on the bottom, whereas the magnet on the right has the opposite poles where "S" is on top and "N" is on the bottom. The induction coil 1005 (inductor) is shown below the magnets 1000. The curved arrows through the working surface 1010 represent the magnetic induction B. The coils are going into and out of the figure. The Lorentz Force F induced in the working surface is shown with left to right arrows. In this configuration, the working surface 1010 vibrates in the left to right direction (and vice versa). The load 920 would be positioned on the right of the working surface 1010 (in this figure) to receive the energy from the vibration. In practice, multiple EMAT devices having this configuration may be used sandwiching the load 920 between the EMAT devices, e.g., one to the left and one to the right of the load 920. The EMAT devices may be controlled to vibrate in synchronization or alternate. FIG. 10 also shows the induced Eddy Current J, which would be into and out of the figure.

Figure 11:
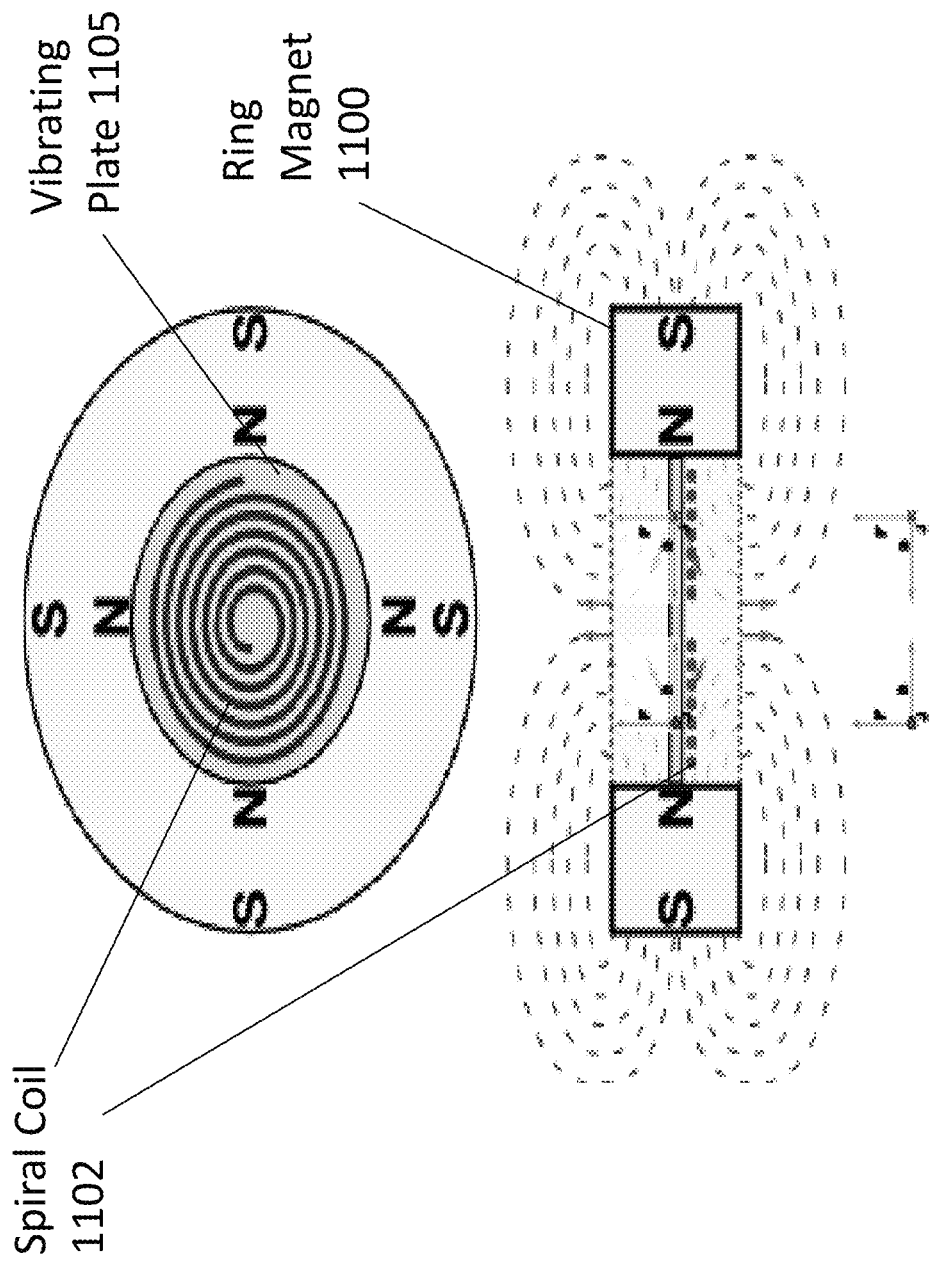
FIG. 11 are sectional views of another example of an EMAT device in accordance with aspects of the disclosure, showing the magnetic field generated in the depicted orientation and an induced Lorentz force.

FIG. 11 illustrates another example of an EMAT device in accordance with aspects of the disclosure. FIG. 11 shows two different views, a plan view and a sectional (cutaway) side-view. In this example, the EMAT device comprises a ring magnet 1100. The ring magnet 1100 is poled to an inside-out (radial) pattern. The "N" is on the inner side of the ring and the "S" is on the outer side. The working surface here is a vibrating plate 1105 (e.g., a metal disk). The vibrating plate 1105 is disposed in the ring magnet's bore. The inductor is a spiral coil 1102. The spiral coil 1102 is also disposed in the ring magnet's bore. In this orientation, the spiral coil 1102 is below the vibrating plate 1105. The dashed lines represent that magnetic induction B. The magnetic induction has an ellipsoidal shape, respectively going from "N" to "S". The Eddy Current J is directed into and out of the figure. As such, the Lorentz force F is directed upward, which enables acceleration in the up/down direction (out of the plane of the disk) to couple with the load (e.g., wet fabric) as shown in the vectors "F". "B" and "J". The vector view is superimposed on the ring magnet 1100 and also shown below. The plane being parallel to the diameter (if circular). The force is uniform across the disk.

Figure 12:
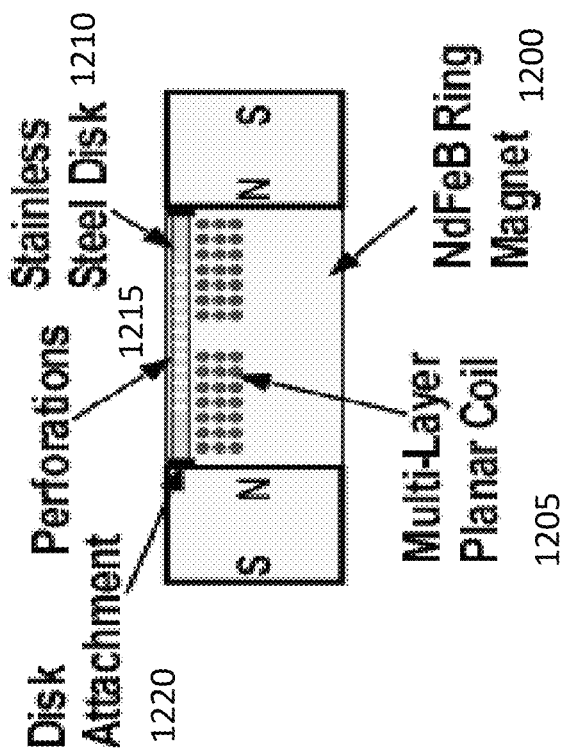
FIGS. 12-14 illustrate sectional views of different examples of EMAT devices in accordance with aspects of the disclosure.

FIG. 12 illustrates another example of an EMAT device in accordance with aspects of the disclosure (showing cutaway view). In this example, the EMAT device also comprises a ring magnet 1200. The poling of the ring magnet 1200 is similar to the magnet 1100 shown in FIG. 11. Ring magnet 1200 is made from NdFeB. The working surface 910 is a stainless steel disk 1210 (vibrating plate). The stainless steel disk 1210 is attached to the ring magnet 1200 via a disk attachment 1220. As illustrated, the stainless steel disk 1210 is positioned slightly below the top of the ring magnet 1200. However, in other aspects, the disk 1210 may be flush with the top of the ring magnet 1200. The disk attachment 1220 may be epoxy. In this example, the stainless steel disk 1210 has a plurality of perforations 1215. These perforations function as described above to allow droplets of fluid to go through the stainless steel disk 1210. The inductor is a multi-layer planar coil 1205. Both the planer coil 1205 and stainless steel disk 1210 are disposed in the bore of the ring magnet 1200. Similar to the example, depicted in FIG. 11, the Lorentz force F is directed upward, which enables acceleration in the up/down direction (out of the plane of the disk) to couple with the load (e.g., wet fabric).

Figure 13:
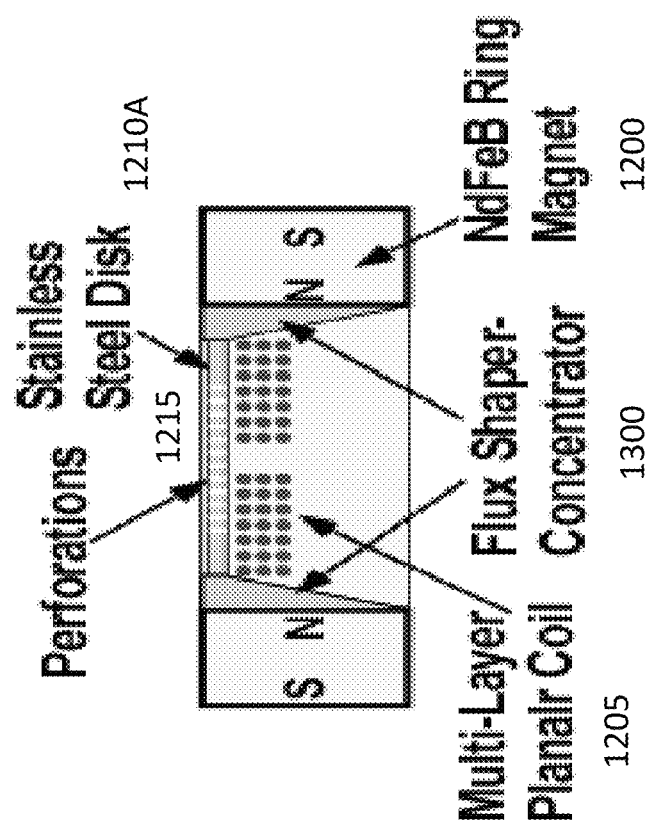

FIG. 13 illustrates another example of an EMAT device in accordance with aspects of the disclosure. Many of the components of the EMAT device in FIG. 13 are similar to FIG. 12 and will not be described again in detail. FIG. 13 is also a cutaway view. In this example, a flux-shaper-concentrator 1300 is used and the stainless steel disk 1210A is shorter than the same in the example depicted in FIG. 12. The flux-shaper-concentrator 1300 may be made from permalloy. In the example depicted in FIG. 12, the magnetic induction field B may have field lines which are curling at the edges. This may result in a generated Lorentz force F not being uniformly perpendicular to the surface. Thus, in an aspect of the disclosure, a flux-shaper-concentrator 1300 forces the magnetic flux to concentrate and emerge at the edge of the stainless steel disk 1210A. In an aspect of the disclosure, there is a gap between the flux-shaper concentrator 1300 and the extended disk 1210B to allow the disk 1210B to vibrate. The flux-shaper-concentrator 1300 is mechanically connected with the NdFeB ring magnet 1200.

Figure 14:
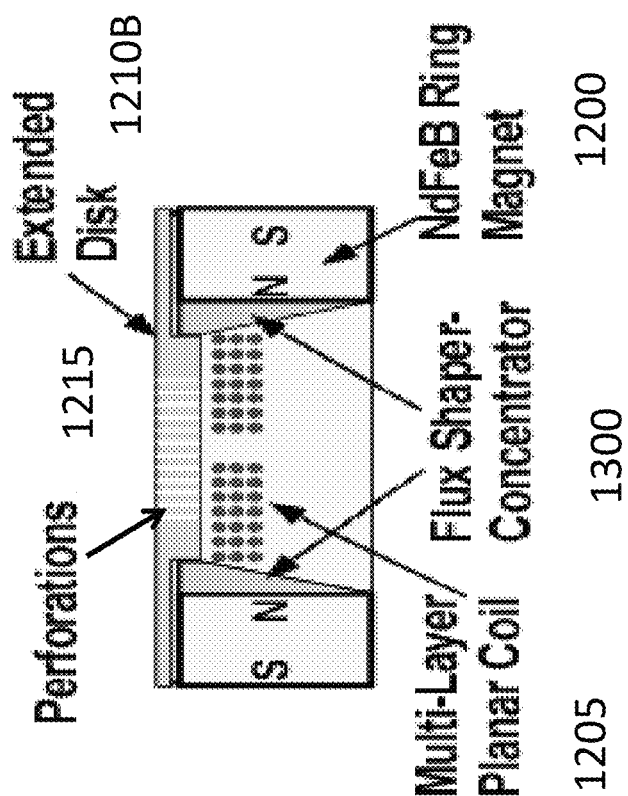

FIG. 14 illustrates another example of an EMAT device in accordance with aspects of the disclosure, where the stainless steel disk is extended as an Extended Disk 1210B (showing a cutaway view). By using the Extended Disk 1210B, full use of the available area for the disk and magnet are used to provide more surface area to contact the load 920 allowing for more efficient and effective drying.

Figure 15:
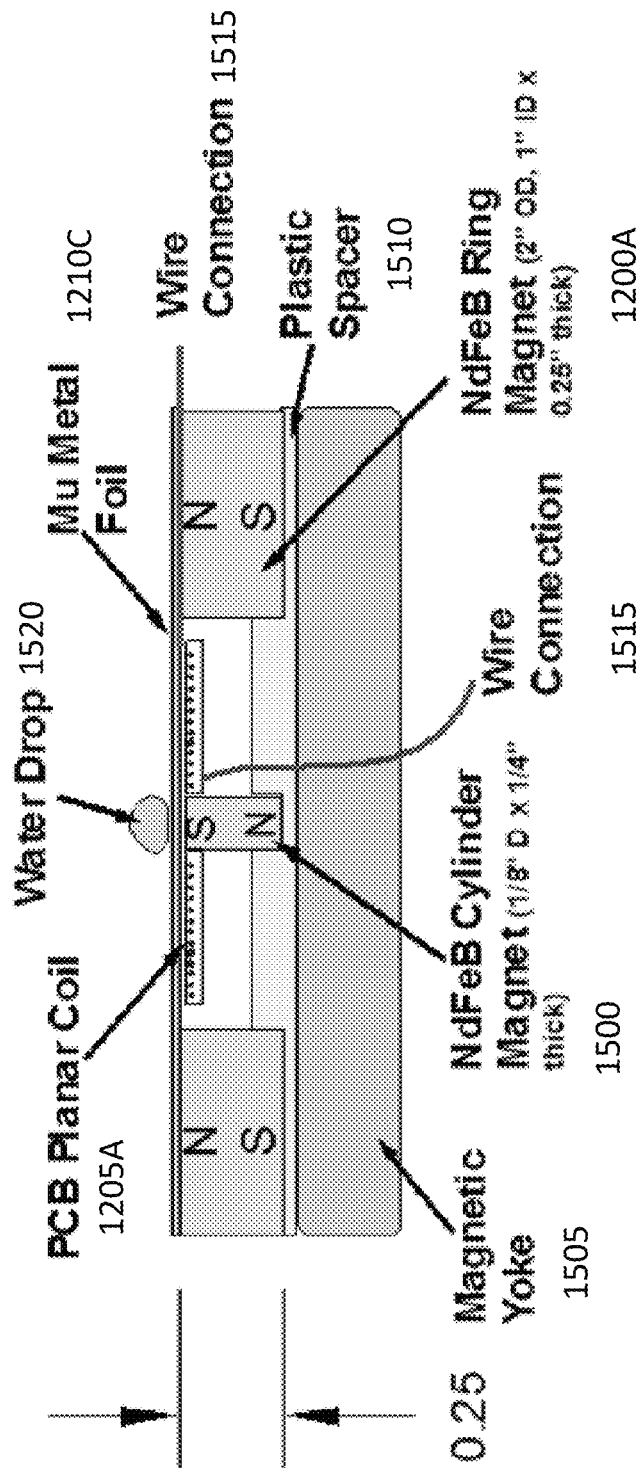
FIG. 15 illustrates a section view of another example of an EMAT device used for drying in accordance with aspects of the disclosure.

FIG. 15 illustrates another example of an EMAT device in accordance with aspects of the disclosure (showing a cutaway view). In the example depicted in FIG. 15, two magnets are used. The first magnet is similar to described above, e.g., NdFeB ring magnet 1200A. As shown, the ring magnet 1200A has an outer diameter of 2 inches and an inner diameter of 1 inch. The ring magnet 1200A has a thickness of 0.25 inches. These dimensions are for descriptive purposes only and other dimensions may be used. The second magnet is a cylinder magnet 1500 disposed in the center of the ring magnet 1200A. As shown, the cylinder magnet 1500 is made from the same material as the ring magnet 1200A; however, other materials may be used. Also as shown, the cylinder magnet 1500 has a diameter of 0.125 inch and a 0.25 inch thickness. Once again, these dimensions are for descriptive purposes only and other dimensions may be used.

The poles of the ring magnet 1200A and the cylinder magnet are opposite.

The cylinder magnet 1500 is positioned within a plastic spacer 1510. In an aspect of the disclosure, the plastic spacer 1510 may be for centering of the cylinder magnet 1500. The thickness of the spacer 1510 should be minimized to reduce any decrease in the total available magnetic field. The total available magnetic field decreases with an increase in the distance between the ring/cylinder magnet and the yoke. The working surface is a Mu metal foil 1210C. The Mu metal foil 1210C extends the length of the ring magnet. The foil 1210C is disposed on top of the ring magnet 1200A and the cylinder magnet 1500. The inductor is a PCB planar coil 1205A. Wire connections 1515 are coupled to the PCB planer coil 1205A. These wire connections 1515 electrically couple the PCB planar coil 1205A to the drive circuit 35A and the capacitor in the oscillating circuit 15A. FIG. 15 also shows a water drop 1520 on the MU metal foil 1210C as an example of where the water contacts the working surface 910 when drying a load 920.

The cylinder magnet 1500 (located at the center) radially completes the return flux. In the example depicted in FIG. 15, the EMAT device further comprises a magnetic yoke 1505. The magnetic yoke 1505 is located on the opposite side of the magnets 1200A and 1500 with respect to Mu metal foil 1210C. The magnetic yoke 1505 also functions to complete the flux. The magnetic yoke 1505 may be made of any material that has a magnetic saturation above the field strength of the magnets.

Figure 16:
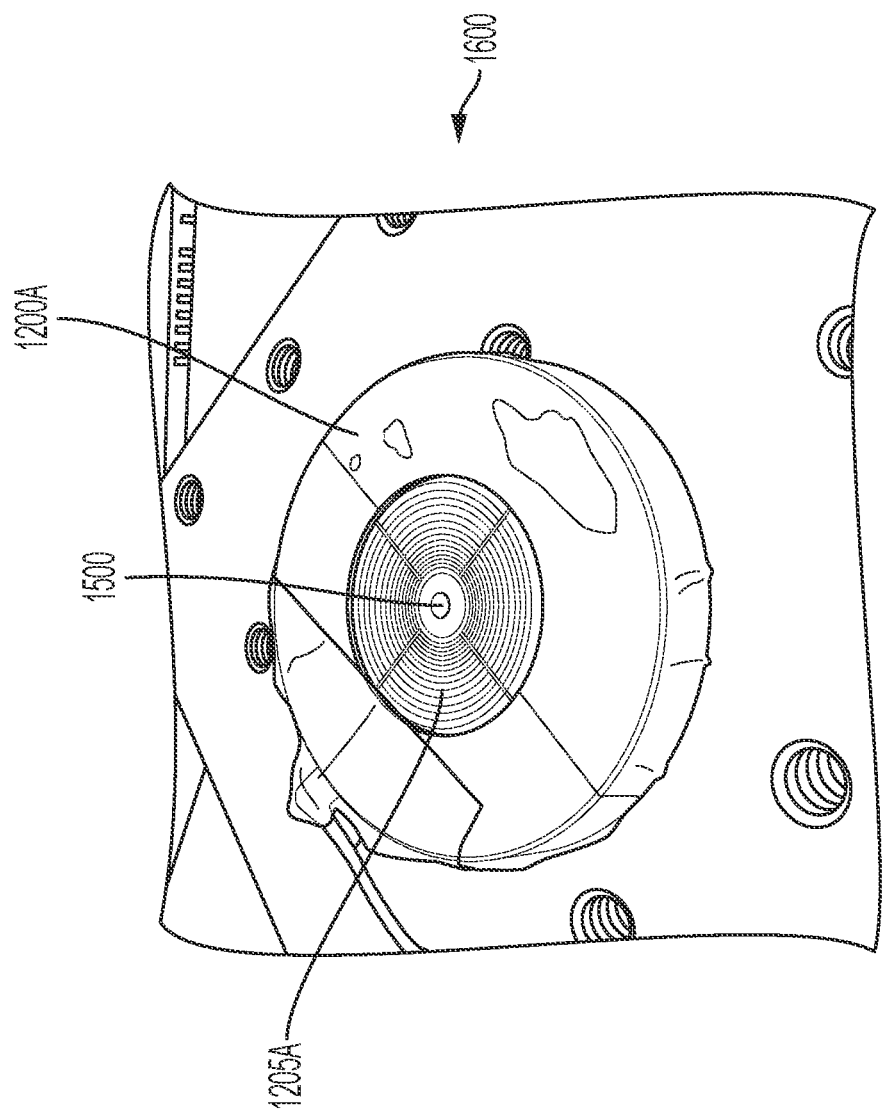
FIG. 16 is an illustration of the device shown in the sectional view of FIG. 15.

FIG. 16 is an illustration of the device shown in the sectional view of FIG. 15. The EMAT device 1600 shown in FIG. 16 has the MU metal foil 1210C removed. A stainless steel plate below the disk acts as the magnetic yoke 1505. As shown, the stainless steel plate has a different shape from the disk. In practice, the shape of the magnetic yoke 1505 may match the shape of the disk. In this view, both the ring magnet 1200A and the cylinder magnet 1500 are seen. The PCB planar coil 1205A is shown between the ring magnet 1200A and cylinder magnet 1500. The magnets are coated with an insulator. The gaps in the stainless steel plate shown in the figure are not the perforations mentioned herein, rather the test plate used had gaps.

Figure 17:
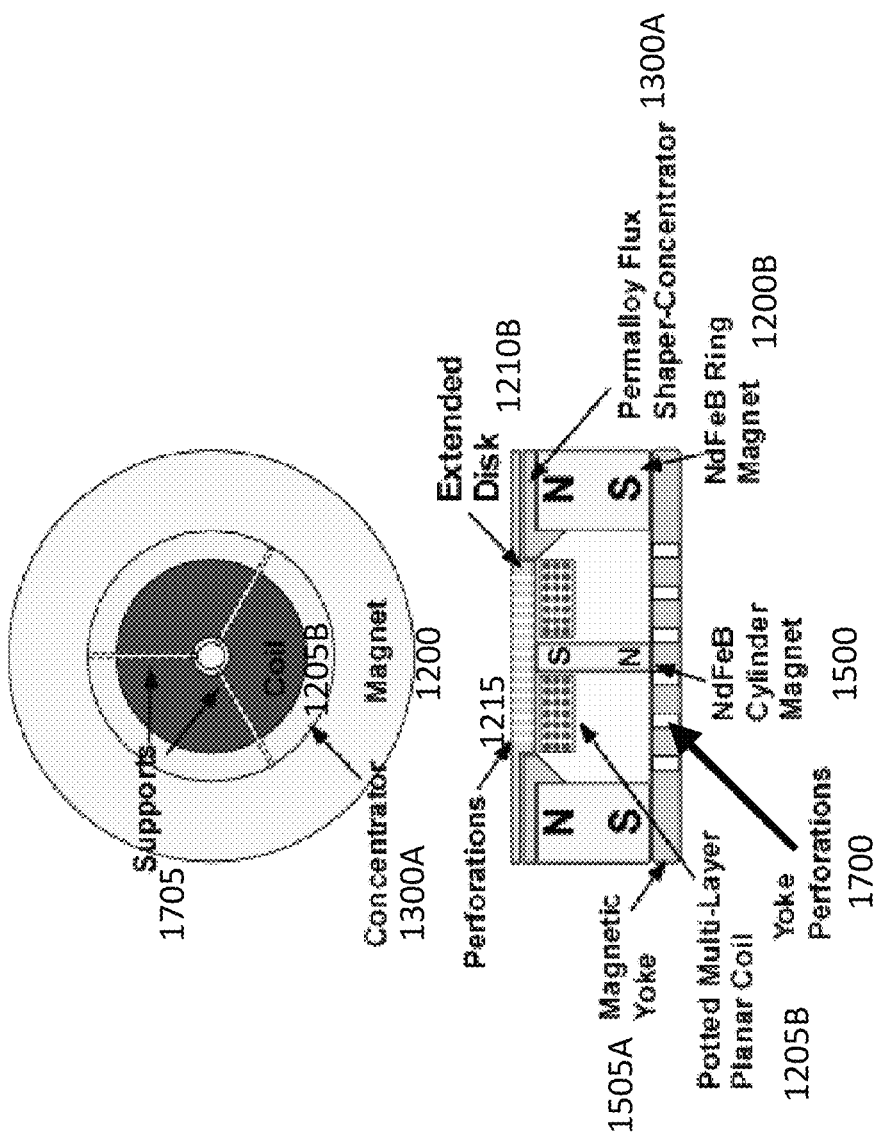
FIG. 17 illustrates sectional views of another example of an EMAT device in accordance with aspects of the disclosure.

FIG. 17 illustrates another example of an EMAT device in accordance with aspects of the disclosure. FIG. 17 shows two views: a plan view and a side-sectional view. In the example depicted in FIG. 17, both the working surface 910 (extended disk 1210B) and the magnetic yoke 1505A have perforations (1215 and 1700 respectively). These allow fluid droplets (nebulized water) to escape the EMAT device. Additionally, the plastic spacer shown in FIG. 15 is removed. The magnets 1200B and 1500 are mounted directly on the magnetic yoke 1505A. A permalloy flux-shaper-concentrator 1300A is used to force the magnetic flux to concentrate and emerge at the edge of the stainless steel disk 1210B. The stainless steel disk 1210B extends to the edge of the ring magnet 1200B. The induction coil is a potted multi-layer planer coil 1205B. The potting material may be epoxy. The potting material provides protection against, water, environmental humidity, thermal shock and vibration. In an aspect of the disclosure, the potting material is also electrically insulating but thermally conductive.

The EMAT device has a plurality of supports 1705. The supports 1705 hold the cylinder magnet 1500 and the potted multi-layer planar coil 1205B fixed. In an aspect of the disclosure, the supports 1705 may be made of plastic or ceramic materials. In other aspects of the disclosure, the supports 1705 may be made from carbon fibers or metallic (non-magnetic material).

In an aspect of the disclosure, the EMAT device may have a diameter of 2.00 inches, which is the same as the outer diameter of the ring magnet 1200B. The bore in the ring magnet may have a diameter of 0.88 in. In other aspects, the diameter of the bore may be 1.00 inch. The ring magnet 1200B and the cylinder magnet 1500 may have a thickness of 0.25 inches. The magnetic yoke 1505A may have a thickness of 0.125 inch. In an aspect of the disclosure, the permalloy flux-shaper-concentrator 1300A may have a maximum thickness of 0.06 inch. These dimensions are for descriptive purposes only and other dimensions may be used. The size of the perforations in the disk 1215 and the yoke perforations 1700 is selected to balance between an increase in the reluctance in the magnetic path (which is undesirable) and the ability to have the nebulized water to escape. The size of the perforations in the disk 1215 and yoke perforation 1700 may be the different. Also, the number of perforations in the disk 1215 and yoke perforations 1700 may be different. In other aspects of the disclosure, the size and number may be the same.

Once again, in this configuration, the Lorentz force F is out of the plane of the extended disk, e.g., out of the plan view in FIG. 17.

Figure 18:
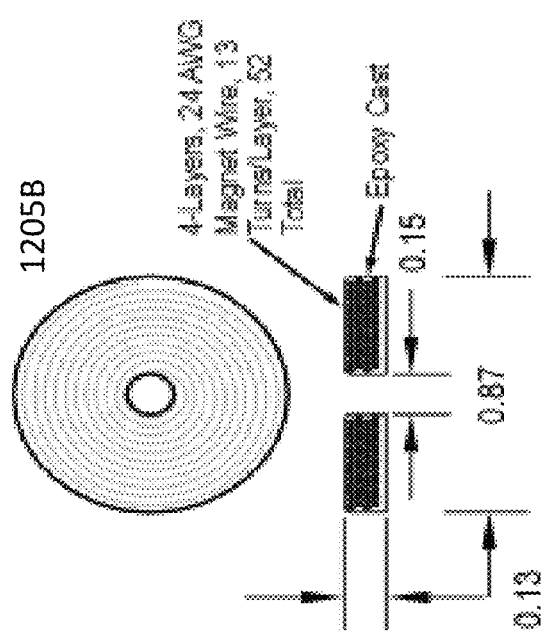
FIG. 18 illustrates an example of an inductive coil in accordance with aspects of the disclosure.

FIG. 18 illustrates an example of induction coil, e.g., potted multi-layer planar coil 1205B) in accordance with aspects of the disclosure. In an aspect of the disclosure, the coil 1205B may have four layers. Each layer may have 13 turns for a total of 52 turns. The wire may be 24 AWG magnetic wire. Other wire gauges may be used. The coil 1205B is dimensioned to fit within the bore of the ring magnet. Accordingly, in an aspect of the disclosure, the coil 1205B may have a diameter of 0.87 inch (which is 0.01 less than the diameter of the bore of the ring magnet in the above-example). The thickness of the coil 1205B (of the four layers) may be 0.13 inch. The coil may have a central opening. The central opening may have a diameter of 0.15 inch. Once again, these dimensions (number of layers and turns) are for descriptive purposes only and other dimensions (number of layers and turns) may be used.

International Publication WO 2016/182832, entitled "Dryer Using High Frequency Vibration" describes various configurations for a dryer having a piezoelectric system, which are incorporated herein by reference. The EMAT system 950 described herein may replace the piezoelectric system described in the same and be positioned and orientated in the same manner as described for the piezoelectric system and device.

In an aspect of the disclosure, the magnetic yoke 1505A may be coupled to a fluid channel or fluid reservoir, which in turn may be coupled to a drainage system (not shown) to expunge the fluid from a dryer having the EMAT system 950. In other aspects of the disclosure, the magnetic yoke 1505A may be directly coupled to the drainage system (not shown).

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "Controller" as may be used in the present disclosure may include a variety of combinations of fixed and/or portable computer hardware, software, peripherals, and storage devices. The "Controller" may include a plurality of individual components that are networked or otherwise linked to perform collaboratively, or may include one or more stand-alone components. The hardware and software components of the "Controller", of the present disclosure may include and may be included within fixed and portable devices such as desktop, laptop, and/or server, and network of servers (cloud).

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. An electromagnetic acoustic transducer (EMAT) system comprising:
   at least one magnet configured to generate a static magnetic field;
   an oscillating circuit comprising a first inductor and a first capacitor, the first inductor having a first terminal and a second terminal, the oscillating circuit configured to generate an electromagnetic field;
   a working element, when exposed to the static magnetic field and the electromagnetic field vibrates against a load, the vibration having an amplitude, an acceleration and a frequency; and
   a drive circuit couplable to an AC power source and the oscillating circuit, the drive circuit configured to regulate the amplitude, the drive circuit comprising:
      an AC-DC conversion circuit configured to convert AC power from the AC power source into DC power; and
      a switch, a first terminal of the switch being coupled to the second terminal and a second terminal of the switch being coupled to ground and a third terminal of the switch being coupled to a switch control circuit, the switch being turned on when an integrated signal representative of a difference of a voltage proportional to the first terminal and a voltage proportional to the second terminal of the first inductor is between a first voltage threshold and a second voltage threshold and based on a timing signal.

2. The system of claim 1, wherein the first inductor is a planar coil, the planar coil being disposed in a bore of one of the at least one magnet.

3. The system of claim 1, wherein the system is configured to atomize fluid from the load.

4. The system of claim 3, wherein at least one of the frequency and the amplitude is variable based on a type of the load.

5. The system of claim 4, further comprising a moisture sensor, wherein at least one of the frequency and the amplitude is variable based on a detection result of the moisture sensor.

6. The system of claim 5, wherein the frequency is varied by changing a capacitance of the first capacitor.

7. The system of claim 5, wherein the amplitude is variable by increasing or decreasing at least one of the first voltage threshold and the second voltage threshold.

8. The system of claim 5, wherein the amplitude is variable by changing the timing signal.

9. The system of claim 8, further comprising a timing circuit configured to output the variable timing signal.

10. The system of claim 1, wherein the at least one magnet comprises a first magnet and a second magnet, the first magnet is a ring magnet and the second magnet is a cylinder magnet, the ring magnet surrounding the cylinder magnet, wherein the first inductor is a planer coil disposed perpendicular to the poles of the ring magnet and the cylinder magnet and wherein the working element is a metal disk.

11. The system of claim 10, further comprising a magnetic yoke disposed on an opposite side of the ring magnet and the cylinder magnet with respect to the metal disk.

12. The system of claim 11, wherein the frequency is between about 40 kHz to about 1 MHz.

13. The system of claim 11, wherein the metal disk has a plurality of perforations or slots, the perforations or slots being dimensioned to receive liquid from the load.

14. The system of claim 11, wherein the magnetic yoke has a plurality of perforations or slots, the perforations or slots being dimensioned to receive liquid from the load.

15. The system of claim 1, wherein the at least one magnet and the first inductor are arranged such that a force vector induced by the static magnetic field and the electromagnetic field is perpendicular to a plane of the working element.

16. The system of claim 15, wherein the at least one magnet is a ring magnet where the pole thereof are arranged is a radial direction, and wherein the working element is a metal disk having at least a portion disposed in a bore of the ring magnet and wherein the first inductor is a planar coil disposed in the bore.

17. The system of claim 11, further comprising a flux concentrator disposed adjacent to the at least one magnet and configured to channel the fields to the metal disk.

18. The system of claim 1, wherein the drive circuit further comprises a decoupling device between the AC-DC conversion circuit and the oscillating circuit.

19. The system of claim 18, wherein the decoupling device is a diode coupled in series with a second inductor, where the second inductor is coupled to the oscillating circuit.

20. The system of claim 19, further comprising a second capacitor having a first plate and a second plate, the first plate being coupled to the second inductor and the oscillating circuit and the second plate being coupled to the ground.

21. The system of claim 20, further comprising:
a first resistor coupled to a second resistor in series, the first resistor coupled to the first terminal, wherein the voltage proportional to the first terminal is a voltage between the first resistor and the second resistor; and
a third resistor coupled to a fourth resistor in series, the third resistor coupled to the second terminal, wherein the voltage proportional to the second terminal is a voltage between the third resistor and the fourth resistor.

22. The system of claim 21, wherein the first resistor has a different resistance than the third resistor.

* * * * *